US012383895B2

(12) United States Patent
Gundavarapu et al.

(10) Patent No.: US 12,383,895 B2
(45) Date of Patent: Aug. 12, 2025

(54) OPTICAL READER DEVICE FOR MULTIPLEXED DIAGNOSTIC SYSTEMS AND METHODS OF USE

(71) Applicant: SiPhox, Inc., Burlington, MA (US)

(72) Inventors: Sarat Gundavarapu, Cambridge, MA (US); Diedrik Rene Vermeulen, Arlington, MA (US)

(73) Assignee: SiPhox, Inc., Burlington, MA (US)

( * ) Notice: Subject to any disclaimer, the term of this patent is extended or adjusted under 35 U.S.C. 154(b) by 0 days.

(21) Appl. No.: 18/124,337

(22) Filed: Mar. 21, 2023

(65) Prior Publication Data

US 2024/0058814 A1 Feb. 22, 2024

Related U.S. Application Data

(60) Provisional application No. 63/302,370, filed on Jan. 24, 2022.

(51) Int. Cl.
*B01L 3/00* (2006.01)

(52) U.S. Cl.
CPC ..... *B01L 3/502715* (2013.01); *B01L 2200/04* (2013.01); *B01L 2200/18* (2013.01); *B01L 2300/0636* (2013.01); *B01L 2300/0816* (2013.01)

(58) Field of Classification Search
None
See application file for complete search history.

(56) References Cited

U.S. PATENT DOCUMENTS

2007/0292941 A1* 12/2007 Handique ......... B01L 3/502715 435/287.1
2009/0312188 A1* 12/2009 Duer ................. B01L 3/502715 506/38
2018/0275058 A1 9/2018 Stern
2021/0018439 A1* 1/2021 Neutens ............... G01N 21/645
2021/0293525 A1* 9/2021 Carothers ............. B82Y 15/00
2021/0308673 A1 10/2021 Chiu
2023/0060862 A1* 3/2023 Patel ...................... G02B 6/423

FOREIGN PATENT DOCUMENTS

WO WO2020/132146 A1 * 6/2020 ............. G01N 21/27
WO WO-2021207699 A1 * 10/2021 ............... G01N 1/14

OTHER PUBLICATIONS

Mogensen et al., A Microfluidic Device with an Integrated Waveguide Beam Splitter for Velocity Measurements of Flowing Particles by Fourier Transformation, 2003, Anal. Chem., 75, p. 4931-4936. (Year: 2003).*

* cited by examiner

*Primary Examiner* — Lore R Jarrett

(74) *Attorney, Agent, or Firm* — Caldwell Intellectual Property Law

(57) ABSTRACT

An apparatus for performing analyte detection, wherein the apparatus comprises an optoelectronic reader device, the optoelectronic reader device comprising a microfluidic subassembly comprising a microfluidic pump, the microfluidic pump configured to route the flow of at least a fluid, wherein the at least a fluid contains an analyte, and at least a reservoir configured to contain the at least a fluid, an optics subassembly, the optics subassembly comprising an optical device having at least one light source directed at the at least a fluid, and a sensor device configured to sense the at least a fluid and detect at least an optical property of the analyte, and a portable device, wherein the portable device is configured for point of care diagnostics.

16 Claims, 20 Drawing Sheets

600

OPTICAL READER DEVICE FOR MULTIPLEXED DIAGNOSTIC SYSTEMS AND METHODS OF USE

CROSS-REFERENCE TO RELATED APPLICATIONS

This application claims the benefit of priority of U.S. Provisional Patent Application Ser. No. 63/302,370, filed on Jan. 24, 2022, and titled "OPTICAL READER DEVICE FOR MULTIPLEXED DIAGNOSTIC SYSTEMS," which is incorporated by reference herein in its entirety.

FIELD OF THE INVENTION

The present invention generally relates to the field of opto-electronic reader devices. In particular, the present invention is directed to an opto-electronic reader device to be used for analyte detection in point of care and at-home diagnostics.

BACKGROUND

Over the past decade and especially post the SARS COVID-2 pandemic, the demand for accurate and inexpensive point-of-care and at-home diagnostics has rapidly increased. A multitude of approaches including but not limited to chemical, electrical, and optical sensing have since been researched, proposed, implemented, and commercialized to meet this spiked need for simplified diagnostics.

SUMMARY OF THE DISCLOSURE

In an aspect an apparatus for performing analyte detection is illustrated. Apparatus includes an optoelectronic reader device, wherein the optoelectronic reader device includes a microfluidic subassembly having a microfluidic pump, the microfluidic pump configured to route the flow of at least a fluid, wherein the at least a fluid contains an analyte, and at least a reservoir configured to contain the at least a fluid. Optoelectronic reader device further includes an optics subassembly, the optics subassembly having an optical device having at least one light source directed at the at least a fluid and a sensor device configured to sense the at least a fluid and detect at least an optical property of the analyte. Optoelectronic reader device further includes a portable device, wherein the portable device is configured for point of care diagnostics.

In another aspect a method for analyte detection is illustrated. The method includes receiving an optoelectronic reader device. The optoelectronic reader device includes a microfluidic subassembly having a microfluidic pump, the microfluidic pump configured to route the flow of at least a fluid, wherein the at least a fluid contains an analyte, and at least a reservoir configured to contain the at least a fluid. The optoelectronic reader device further includes an optics subassembly, the optics subassembly having an optical device having at least one light source directed at the at least a fluid, and a sensor device configured to sense the at least a fluid and detect at least an optical property of the analyte. The method further includes flowing, using the microfluidic subassembly, the at least a fluid through the at least a reservoir, emitting, using the optical device, the at least one light source onto the fluid, and sensing, using the sensor device, the optical property of the at least a fluid, wherein the optoelectronic reader device is a portable device configured for point of care diagnostics.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for analyte detection. In some embodiments apparatus includes an optoelectronic reader device and a portable device. The optoelectronic reader device includes a microfluidic sub assembly and an optical sub assembly. In some cases, apparatus may further include a computing device used to receive data related to an analyte. In some cases, apparatus may be enclosed within a housing. In some cases, apparatus may include a battery wherein apparatus may be powered without a wall socket.

Aspects of the present disclosure can be used to perform analyte detection outside of a lab. Users or patients may use apparatus in the comfort of their own home. In addition, users may receive results quicker than in a conventional lab.

Aspects of the present disclosure also allow for multiplexed diagnostics. Exemplary embodiments illustrating aspects of the present disclosure are described below in the context of several specific examples.

Figure 1:
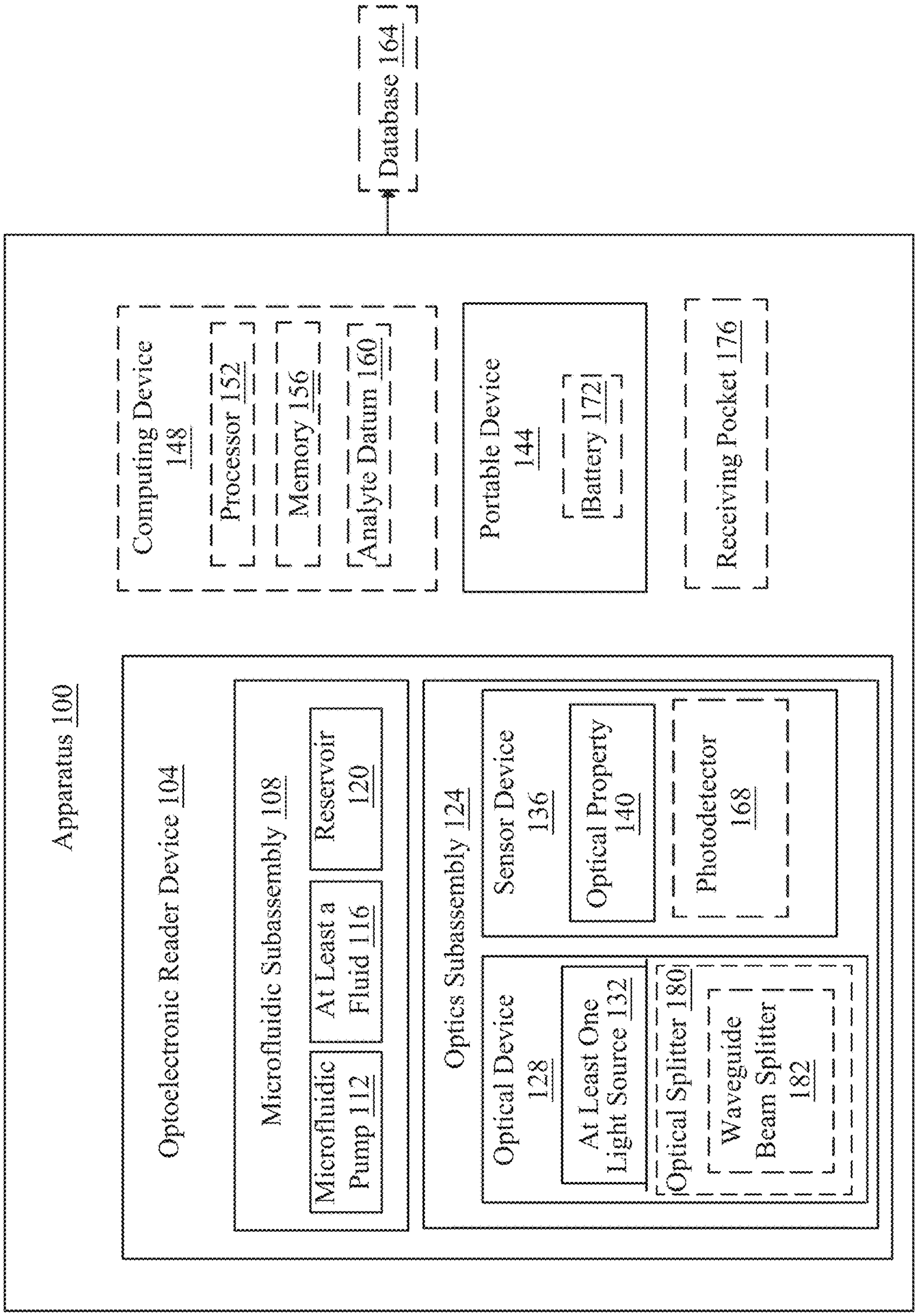
FIG. 1 is an exemplary embodiment of an apparatus for performing analyte detection.
Figure 2:
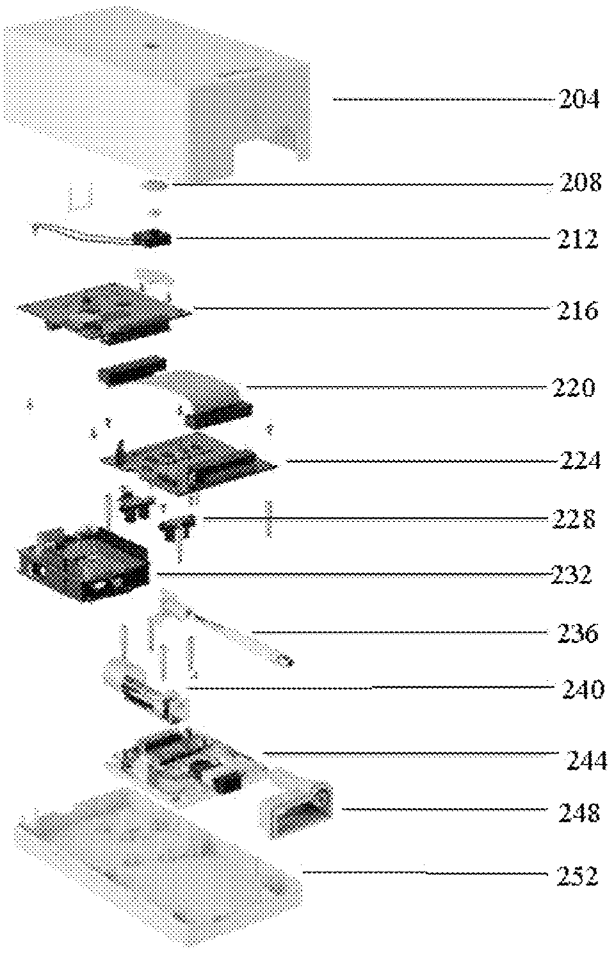
FIG. 2 illustrates an expanded view of an exemplary embodiment of an optical reader device.

Foundry compatible and mass-manufacturable integrated photonic sensor chips when developed in combination with carefully designed biochemistry, analyte collection methods, and microfluidic routing, can enable inexpensive, disposable cartridges for highly sensitive and specific, multiplexed diagnostics. An apparatus as shown in FIG. 1, that interrogates with such cartridges entails an ensemble combination of miniaturized optics, microfluidics, customized driver, and acquisition electronics, and finally a data-secure yet user-friendly, cloud-connected software solution. The present disclosure discusses in part a hand-held optoelectronic reader device apparatus with a miniaturized microfluidic pump that interrogates with disposable microfluidic cartridges containing an integrated photonic chip to be used for point-of-care (POC) or at-home diagnostic systems. In some embodiments, the apparatus as depicted in FIG. 2, is a single, non-limiting example of the reader diagnostic device that can be used to simultaneously detect multiple biological analytes.

Referring now to FIG. 1, an exemplary embodiment of an apparatus 100 for performing analyte detection is illustrated. As used in this disclosure "analyte detection" is the identification of a substance. Substance may include organic or inorganic chemicals. In some embodiments, apparatus 100 used for analyte detection may include a wide range of applications such as medical diagnostics, drug discovery, environmental monitoring, food safety testing and the like. Apparatus 100 may include a computing device. Computing device 148 may include any computing device 148 as described in this disclosure, including without limitation a microcontroller, microprocessor, digital signal processor 152 (DSP) and/or system on a chip (SoC) as described in this disclosure. Computing device 148 may include, be included in, and/or communicate with a mobile device such as a mobile telephone or smartphone. Computing device 148 may include a single computing device 148 operating independently or may include two or more computing device 148 operating in concert, in parallel, sequentially or the like; two or more computing devices may be included together in a single computing device 148 or in two or more computing devices. Computing device 148 may include a processor 152 and a memory communicatively connected to the processor. Computing device 148 may interface or communicate with one or more additional devices as described below in further detail via a network interface device. Network interface device may be utilized for connecting computing device 148 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 148 may include but is not limited to, for example, a computing device 148 or cluster of computing devices in a first location and a second computing device 148 or cluster of computing devices in a second location. Computing device 148 may include one or more computing devices dedicated to data storage, security, distribution of traffic for load balancing, and the like. Computing device 148 may distribute one or more computing tasks as described below across a plurality of computing devices of computing device, which may operate in parallel, in series, redundantly, or in any other manner used for distribution of tasks or memory between computing devices. Computing device 148 may be implemented, as a non-limiting example, using a "shared nothing" architecture.

With continued reference to FIG. 1, computing device 148 may be designed and/or configured to perform any method, method step, or sequence of method steps in any embodiment described in this disclosure, in any order and with any degree of repetition. For instance, computing device 148 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 148 may perform any step or sequence of steps as described in this disclosure in parallel, such as simultaneously and/or substantially simultaneously performing a step two or more times using two or more parallel threads, processor 152 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes an optoelectronic reader device 104. Optoelectronic reader device 104 includes a microfluidic subassembly 108. "Optoelectronic reader device" as described herein is a device configured for detection of an analyte using light. "Microfluidic subassembly" is a device and/or subassembly that is configured to act upon fluids on a small or micro scale. On a microscale, the physical and chemical properties of fluids behave differently wherein a microfluidic device may exploit those differences. Microfluidic subassembly 108 may be consistent with a microfluidic device as described in U.S. patent application Ser. No. 17/859,932, filed on Jul. 7, 2022, entitled "SYSTEM AND METHODS FOR FLUID SENSING USING PASSIVE FLOW," the entirety of which is incorporated herein by reference.

With continued reference to FIG. 1, Microfluidic subassembly 108 includes a microfluidic pump 112. Microfluidic pump 112 may include pump. Pump may include a substantially constant pressure pump (e.g., centrifugal pump) or a substantially constant flow pump (e.g., positive displacement pump, gear pump, and the like). Pumps can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir 120 into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. In some embodiments, microfluidic pump 112 may include a syringe pump. "Syringe pump" as described herein is a device used to deliver a fluid using a syringe barrel and a syringe plunger. The syringe plunger may be used to route a fluid through the syringe barrel and into a microfluidic channel as will be described in further detail below. In some embodiments, syringe plunger may refer to a piston wherein a motor drives the piston and routes a fluid through syringe barrel. In some cases, syringe pump may be used to draw a fluid into syringe barrel. Syringe pump may be utilized in situations in which a user may seek to control the flow of a fluid. In some embodiments, a syringe needle diameter may vary such that a user may vary the flow rate of a fluid. In some embodiments, microfluidic pump 112 may include a precision pump also known as a pressure driven pump. A precision pump as defined herein is a pneumatic pump in which a flow of a fluid is controlled through a source of pressure applied onto the fluid. A pressure is applied, using a pressured gas, into a fluid reservoir 120 wherein the fluid is pushed through microfluidic channels. The flow rate of the fluid is measured by the pressure applied onto the fluid. In some embodiments, microfluidic pump 112 may include a peristaltic pump. "Peristaltic pump" as described herein, also referred to hose and tube and pump is a pump in which rollers squeeze a tube thereby routing the fluid through the tube. Rollers may be turned using a motor. Additional disclosure on plungers and actuating microfluids is disclosed in U.S. Nonprovisional application Ser. No. 18/107,135, filed on Feb. 8, 2023, and entitled "APPARATUS AND METHODS FOR ACTUATING FLUIDS IN A BIOSENSOR CARTRIDGE," the entirety of each of which is incorporated herein by reference.

With continued reference to FIG. 1, microfluidic pump 112 is configured to rout the flow of at least a fluid 116, wherein the fluid contains an analyte. At least a fluid 116 may include a fluid. Fluid may contain one or more suspensions and/or solutions of reagents, molecules, or other items to be analyzed and/or utilized, including without limitation monomers such as individual nucleotides, amino acids, or the like, one or more buffer solutions and/or saline solutions for rinsing steps, and/or one or more analytes to be detected and/or analyzed. Fluid and/or microfluidic subassembly 108 may be used, without limitation, in processes as disclosed in U.S. Nonprovisional application Ser. No. 17/337,931, filed on Jun. 3, 2021, and entitled "METHODS AND SYSTEMS FOR MONOMER CHAIN FORMATION," and/or as disclosed in U.S. Nonprovisional application Ser. No. 17/403,480, filed on Aug. 16, 2021, and entitled "TAGGED-BASE DNA SEQUENCING READOUT ON WAVEGUIDE SURFACES," the entirety of each of which is incorporated herein by reference.

With continued reference to FIG. 1, microfluidic subassembly 108 further includes at least a reservoir 120 configured to contain at least a fluid 116. At least a reservoir 120 includes a reservoir 120. Reservoir 120 may have at least an inlet, at least an outlet, or both. Reservoir 120 may further include, without limitation, a well, a channel, a flow path, a flow cell, a pump, and the like. In a non-limiting example, fluid may be input through at least an inlet into reservoir 120 and/or output through the at least an outlet. At least an outlet may be connected to other components and/or devices within microfluidic sub assembly or optoelectronic reader device 104. For instance, and without limitation, at least an outlet may be connected to other microfluidic subassembly 108 such as a microfluidic channel as described below in this disclosure.

With continued reference to FIG. 1, in some embodiments, microfluidic subassembly 108 may include at least a channel. Additionally, or alternatively, reservoir 120 may include a channel. As used in this disclosure, a "channel" is a reservoir 120 having one or more of an inlet (i.e., input) and an outlet (i.e., output). Channels may have a sub millimeter scale consistent with microfluidics. Channels may have channel properties which affect other system properties (e.g., flow properties, flow timing, and the like). As used in this disclosure, "flow timing" is any time-dependent property associated with a flow of at least a fluid 116. For instance, in some cases, flow timing may include a duration for a flow to reach, pass through, or otherwise interact with an element of microfluidic device 104 and/or other microfluidic features; for instance, and without limitation, flow out from reservoir 120. As used in this disclosure, "channel properties" are objective characteristics associated with channels or a microfluidic device generally. Exemplary non-limiting channel properties include width, height, length, material, surface roughness, cross-sectional area, layout, and the like. Additionally, or alternatively, microfluidic subassembly 108 may include a microfluidic circuit. As used in this disclosure, a "microfluidic circuit" is a configuration of a plurality of microscale fluidic components within microfluidic subassembly 108. Microscale fluidic components may include any components of microfluidic subassembly 108 as described herein. In a non-limiting example, microfluidic circuit may include a configuration of channels, individually addressable valves, and chambers through which fluid is allowed to flow. Additional disclosure on microfluidic subassemblies or features is disclosed in U.S. Nonprovisional application Ser. No. 18/121,712, filed on Mar. 15, 2023, and entitled "APPARATUS AND METHODS FOR PERFORMING MICROFLUIDIC-BASED BIOCHEMICAL ASSAYS," the entirety of each of which is incorporated herein by reference With continued reference to FIG. 1, optoelectronic reader device 104 includes an optics subassembly 124. "Optics subassembly" as described herein is a device used to detect the analyte within microfluidic subassembly 108. Optics subassembly 124 includes an optical device 128 having at least one light source directed at the at least a fluid 116. "Optical device" as described herein is a device capable of emitting light. In some embodiments, optical device 128 may emit multiple lights from multiple light sources. Optical device 128 may include a laser emitting device. Optical device 128 may include a distributed feedback laser (DFB), a (sampled grating) distributed Bragg reflector laser (DBR laser), a vertical-cavity semiconductor emitting laser (VCSEL), a Vernier-tuned (VT) DBR laser, coupled ring-resonator laser (CRR), or any other laser diode configuration that may be tunable thermally across the resonances of a sensing element. The optics subassembly 124 and/or its components may be fully or partially integrated on a chip or through alignment and packaging of multi-photonic chips or a hybrid version of these alternatives. The choice of the light source of optical device 128 may be determined by the required wavelength resolution for sensing, the material platform of the passive components, and/or the sampling rate of the read-out electronics. The frequency drift of the laser caused by the inherent white and flicker frequency noise components may lower the achievable wavelength resolution in the sampling period while the required relative-intensity-noise and the output power of the laser may be determined by the dynamic range of the electronics and the extinction ratio of the sensor element. In some embodiments, optical device 128 may include a light emitting diode (LED) or an organic LED. Optical device 128 may further include optical fibers to transit at least one or more light. Optical With continued reference to FIG. 1, optical device 128 may include an optical splitter 180 configured to split at least one light source 128 into more than one light beam. "Optical splitter" as defined herein is a waveguide structure used to split one or more optical signals such as at least one light source 128. Optical splitters 180 receive a light beam through an input and output two or more separate light beams. Optical splitter 180 may include a waveguide beam splitter 182. "Waveguide beam splitter" as described herein is a splitter that outputs multiple light sources from at least one light source 128. Waveguide beam splitter 182 as described herein is a device used to split an incoming electromagnetic wave or light beam into two or more electromagnetic waves or light beams. The two or more electromagnetic waves or light beams are emitted in differing directions such that the waves or light beams are emitted at different objects or areas. In some embodiments an optical splitter 180 or a waveguide beam splitter 182 may be used to combine one or more light sources into one unfirm beam. Waveguide beam splitter 182 is a passive device in which a light is input into one end and two or more light sources are output at a second end. In some embodiments, waveguide beam splitter 182 may split at least one light source 128 into at least 50 light beams. In some embodiments, waveguide beam splitter 182 may split one or more light beams into differing ratios wherein one or more light beams have differing power outputs. For example, and without limitation a 50:50 splitter may contain similar output power settings whereas a 5:95 splitter may contain highly differing power output signals; other non-equal splitter ratios may alternatively or additionally be used, including without limitation 25:75, 20:80, 40:60, or the like. In some embodiments optical splitter 180 may include a Y-junction splitter wherein one light source is split into two evenly distributed light sources. Optical splitter 180 may contain multiple Y-junction splitter wherein multiple light sources are split evenly. In some embodiments, optical splitter 180 may include a multimode splitter wherein one light beam may be split into two or more light beams. The two or more light beams may have differing ratios as opposed to Y-junction splitters. In some embodiments, optical device 128 may include a planar-waveguide circuit splitter (PLC). PLC splitter may include, without limitation, an input fiber, an optical splitter 180 chip and a plurality of output fibers; PLC splitter may alternatively include an on-chip and/or photonic component, and may, for instance, be integrated with one or more on-chip waveguides or other optical interfaces. PLC splitter may further include a silica glass substrate wherein multiple waveguides are created by inputting at least one waveguide onto the silica glass substrate. In some embodiments, optical splitter 180 may include a polarization maintaining (PM) splitter. Pm splitter is a splitter wherein the two or more light beams that are output contain the same polarization state as the input signal or light. PM splitters contain output signals in configuration of 2,4 and 8 output signals. PM splitter may be used in situations wherein preserving polarization is beneficial or essential. This may include laboratory testing, medical applications, and the like. In some embodiments PLC splitter may include a PM splitter wherein the output waveguides of PLC maintain their polarization. PLC splitter may include a PM splitter such that at PM fiber array is placed on either end of the PLC splitter. In some embodiments, optical device 128 may include a waveguide, wherein the waveguide is configured to guide at least one light source 128. "Waveguide" as defined herein is a device configured to carry and control electromagnetic waves. Waveguide may control light beams across a specific path. Waveguide may include a cable, glass fiber, or a hollow tube containing a dielectric material that is designed to transmit electromagnetic waves. In some embodiments optical splitter 180 may be configured for multiplexed diagnostics. "Multiplexed diagnostics" as described herein is a process in which a plurality of analyte and/or biological samples are analyzed in a single given sample or fluid. This may be done using multiple light beams wherein each light beam is configured to detect a single analyte, molecule, nucleic acid or the like. In some embodiments, the one or more light beams are individually emitted at more than one analyte, wherein at least one of the more than one light beams is exposed to at least a fluid 116.

With continued reference to FIG. 1, optics subassembly 124 includes a sensor. In some embodiments, sensor may include a photonic sensor. "Photonic sensor" as described herein is a device that is used to detect the physical properties of an analyte. Sensor may detect an optical property 140 such as a refractive index of the material, absorption, or emission properties. Optical properties received from the sensor may then be used to determine what the analyte in question may be. In addition, sensor may detect analyte properties such as the quantity or size of the analyte. Sensor may include a fiber optic sensor. "Fiber optic sensor" as described herein is a sensor using fiber-optic cables to transmit light to and from the analyte or the sensing element. Fiber optic sensor may receive an incoming light and convert the light into an electrical signal wherein the electrical signal may be used to extrapolate data such as the physical properties of the analyte or the sensing element. Fiber optics sensor may include a fiber Bragg grating sensor, a Fabry-Perot sensor, an evanescent wave sensor and any other fiber optic sensor that may be used to detect an analyte or sensing element. Sensor may include an evanescent wave (EW) sensor wherein EW sensor measures changes in refractive index, fluorescence, spectroscopic shifts, and any other changes in the evanescent field. Sensor may further include planar waveguide sensors, laser-based sensors, fluorescence sensors, photonic crystal sensors and the like. In some embodiments, sensor device 136 includes a photodetector 168, the photodetector 168 configured to collect a receiving light emitted from optical device 128. optical device 128 may emit a light beam onto an analyte, wherein a receiving light is reflected off of the analyte and detected by a sensor. In some embodiments, photodetector 168 may be configured to detect at least an optical property 140. Photodetector 168 may include a photoemission detector, a thermal detector, a polarization detector, a photochemical detector, a P-N photodiode, a P-I-N photodiode, avalanche photodiodes, phototransistors, an MSM photodetector 168 and the like. Sensor may further include a phototransistor and a signal converter wherein the phototransistor detects a receiving light and converts the receiving light into electrical signals. Signal converter may then convert received light into an electric signal or another signal that may be used to detect an optical property 140.

With continued reference to FIG. 1, in some embodiments, sensor device 136 may include a photodetector 168. In some cases, sensor device 136 may include a plurality of photodetector 168*s*, for instance at least a first photodetector 168 and at least a second photodetector 168. In some cases, at least a first photodetector 168 and/or at least a second photodetector 168 may be configured to measure one or more of first optical output and second optical output, from a first waveguide and a second waveguide, respectively. As used in this disclosure, a "photodetector 168" is any device that is sensitive to light and thereby able to detect light. In some cases, a photodetector 168 may include a photodiode, a photoresistor, a photosensor, a photovoltaic chip, and the like. In some cases, photodetector 168 may include a Germanium-based photodiode. Light detectors may include, without limitation, Avalanche Photodiodes (APDs), Single Photon Avalanche Diodes (SPADs), Silicon Photomultipliers (SiPMs), Photo-Multiplier Tubes (PMTs), Micro-Channel Plates (MCPs), Micro-Channel Plate Photomultiplier Tubes (MCP-PMTs), Indium gallium arsenide semiconductors (InGaAs), photodiodes, and/or photosensitive or photon-detecting circuit elements, semiconductors and/or transducers. Avalanche Photo Diodes (APDs), as used herein, are diodes (e.g., without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs provide a built-in stage of gain through avalanche multiplication. When the reverse bias is less than the breakdown voltage, the gain of the APD is approximately linear. For silicon APDs this gain is on the order of 10-100. Material of APD may contribute to gains. Germanium APDs may detect infrared out to a wavelength of 1.7 micrometers. InGaAs may detect infrared out to a wavelength of 1.6 micrometers. Mercury Cadmium Telluride (HgCdTe) may detect infrared out to a wavelength of 14 micrometers. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. At least a first photodetector 168 may be configured to generate a first signal as a function of variance of an optical property 140 of the first waveguide, where the first signal may include without limitation any voltage and/or current waveform. Additionally, or alternatively, sensor device 136 may include a second photodetector 168 located down beam from a second waveguide. In some embodiments, second photodetector 168 may be configured to measure a variance of an optical property 140 of second waveguide and generate a second signal as a function of the variance of the optical property 140 of the second waveguide.

With continued reference to FIG. 1, in some cases, photodetector 168 may include a photosensor array, for example without limitation a one-dimensional array. Photosensor array may be configured to detect a variance in an optical property 140 of waveguide. In some cases, first photodetector 168 and/or second photodetector 168 may be wavelength dependent. For instance, and without limitation, first photodetector 168 and/or second photodetector 168 may have a narrow range of wavelengths to which each of first photodetector 168 and second photodetector 168 are sensitive. As a further non-limiting example, each of first photodetector 168 and second photodetector 168 may be preceded by wavelength-specific optical filters such as bandpass filters and/or filter sets, or the like; in any case, a splitter may divide output from optical matrix multiplier as described below and provide it to each of first photodetector 168 and second photodetector 168. Alternatively, or additionally, one or more optical elements may divide output from waveguide prior to provision to each of first photodetector 168 and second photodetector 168, such that each of first photodetector 168 and second photodetector 168 receives a distinct wavelength and/or set of wavelengths. For example, and without limitation, in some cases a wavelength demultiplexer may be disposed between waveguides and first photodetector 168 and/or second photodetector 168; and the wavelength demultiplexer may be configured to separate one or more lights or light arrays dependent upon wavelength. As used in this disclosure, a "wavelength demultiplexer" is a device that is configured to separate two or more wavelengths of light from a shared optical path. In some cases, a wavelength demultiplexer may include at least a dichroic beam splitter. In some cases, a wavelength demultiplexer may include any of a hot mirror, a cold mirror, a short-pass filter, a long pass filter, a notch filter, and the like. An exemplary wavelength demultiplexer may include part No. WDM-11P from OZ Optics of Ottawa, Ontario, Canada. Further examples of demultiplexers may include, without limitation, gratings, prisms, and/or any other devices and/or components for separating light by wavelengths that may occur to persons skilled in the art upon reviewing the entirety of this disclosure. In some cases, at least a photodetector 168 may be communicative with computing device, such that a sensed signal may be communicated with computing device.

With continued reference to FIG. 1, sensor is configured to sense at least a fluid 116 and detect an optical property 140. At least a fluid 116 may include an analyte as described above. Sensor may detect an optical property 140 by sensing a receiving light emitted or radiated from analyte. Sensor may convert receiving light into electrical signals. Sensor may detect an optical property 140 of an analyte using the photoelectric effect. "Photoelectric effect" as described herein is an effect in which charged particles are released from a sensing element or analyte when it receives an incoming light or electromagnetic radiation. Sensor may receive the charged particles to detect an optical property 140. Sensor may detect an optical property 140 by determining a change in the amount of light received and the amount of light sent from optical device 128. Sensor may further detect an optical property 140 using the photelectric effect on a plurality of sensors as discussed in this disclosure. In some embodiments receiving light comprises an evanescent wave. "Evanescent wave" as described herein is a wave in which a light beam is emitted at a transparent media and total internal reflection occurs. In an evanescent wave, a receiving light may not be reflected off of the analyte to be detected. Instead, an interferometer device may be used to detect an optical property 140 of the analyte. "Interferometer device" as described herein is a device used to determine a phase shift between two beams emitted from a singular light source. An interferometer splits a light into two beams which travel in two differing directions wherein the two beams are then joined to produce interference. The interference may then be used to detect an optical property 140. In some cases optical device 128 may include a Mach-Zehnder interferometer (MZI), a Michelson interferometer or a Fabry-Perot interferometer (FPI). Optical device 128 may further include any interferometer as described in this disclosure.

With continued reference to FIG. 1, sensor may contain an optical frequency discriminator configured to interpolate a change in resonance wavelength. "Optical frequency discriminator" as described herein is a device that determines a change in frequency between two optical signals. An optical frequency discriminator may contain a sample referencing element in which a signal is received from the sample referencing element for reference. Optical frequency discriminator may use two or more light beams from optical device 128 wherein one of the two or more light beams is emitted at a sample referencing element. Optical frequency discriminator may include an interferometer as described in this disclosure. optical frequency discriminator may contain structures including but not limited to an MZI, which may include, without limitation, a loaded and/or unbalanced ring-grating MZI or the like. MZI may consist of a first beam split into two light beams, wherein one the two light beams is emitted at a referencing element and a relative phase shift is determined between the two beams. Optical frequency discriminator may further contain an FPI wherein a light or optical wave passes through two parallel reflecting surfaces in which multiple reflected beams are created and detected. Optical frequency discriminator may be configured to interpolate a change in resonance wavelength by determining a change in frequency or phase shift between two optical signals as described above. Alternatively or additionally, optical frequency discriminator may detect optical differences such as without limitation phase differences for light or optical waves passed through cascaded rings and/or gratings.

Still referring to FIG. 1, in some embodiments, sensor device 136 may be in communication with computing device. For instance, and without limitation, sensor device 136 may communicate with computing device 148 using one or more signals. As used in this disclosure, a "signal" is a human-intelligible and/or machine-readable representation of data, for example and without limitation an electrical and/or digital signal from one device to another; signals may be passed using any suitable communicative connection. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. A signal may include an optical signal, a hydraulic signal, a pneumatic signal, a mechanical signal, an electric signal, a digital signal, an analog signal, and the like. In some cases, a signal may be used to communicate with a computing device, for example by way of one or more ports. In some cases, a signal may be transmitted and/or received by computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, apparatus 100, sensor, and/or computing device 148 may perform one or more signal processing steps on a signal. For instance, apparatus 100, sensor, and/or computing device 148 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, phase-locked loops, and/or any other process using operational amplifiers or other analog circuit elements. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device 148 or other specialized digital circuits, such as without limitation an application specific integrated circuit (ASIC), a field-programmable gate array (FPGA), or a specialized digital signal processor 152 (DSP). Digital signal processing may be used to perform any combination of typical arithmetical operations, including fixed-point and floating-point, real-valued, and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, apparatus 100 may further comprise a computing device 148 having processor 152 and memory wherein memory is communicatively connected to processor. Computing device 148 may include any computing device 148 as described in this disclosure. Memory may contain instructions configuring processor 152 to receive an analyte datum 160 form the optoelectronic reader device 104. "Analyte datum" as described herein refers to the optical properties of analyte. Analyte datum 160 may include data. Analyte datum 160 may include data referring to the refractive index, intensity, frequency wavelength, polarization and the like. analyte datum 160 may be received by an input device as described in this disclosure. Input device may include any sensor as described in this disclosure. In some cases, memory contains instructions to transmit the analyte datum 160. analyte datum 160 may be transmitted to a display device as described in this disclosure. User may view analyte datum 160 on a display device to determine optical properties of analyte. Memory may further contain instructions to transmit analyte datum 160 to a database 164. Database 164 may be implemented, without limitation, as a relational database 164, a key-value retrieval database 164 such as a NOSQL database 164, or any other format or structure for use as a database 164 that a person skilled in the art would recognize as suitable upon review of the entirety of this disclosure. Database 164 may alternatively or additionally be implemented using a distributed data storage protocol and/or data structure, such as a distributed hash table or the like. Database 164 may include a plurality of data entries and/or records as described above. Data entries in a database 164 may be flagged with or linked to one or more additional elements of information, which may be reflected in data entry cells and/or in linked tables such as tables related by one or more indices in a relational database 164. Persons skilled in the art, upon reviewing the entirety of this disclosure, will be aware of various ways in which data entries in a database 164 may store, retrieve, organize, and/or reflect data and/or records as used herein, as well as categories and/or populations of data consistently with this disclosure. In some cases, computing device 148 may generate analyte information as a function of the analyte datum 160. "Analyte information" as described herein is data relating to the specific name of the analyte. For example Analyte information may include data relating to the name of a Virus or a biomolecule that was detected by sensor device 136. analyte datum 160 may be compared to a plurality of predetermined data and a specific analyte information is generated as a result. Plurality of predetermined data may include a plurality of biomolecules or organic compounds having specific optical properties wherein each optical property 140 may be correlated to a specific biomolecule. Computing device 148 may receive analyte datum 160 and compare it to the plurality of determined data such that analyte information is generated based on a "match" between the optical properties of analyte datum 160 and a match of a specific biomolecule in plurality of predetermined data. In some cases, a user may receive analyte datum 160 from database 164. For example, a user may view analyte datum 160 on a remote device such as a smart phone wherein the smart phone receives analyte datum 160 from database 164. User as described in this disclosure may include an ordinary user such as an individual seeking to determine whether a virus is present within a specific user sample. User may further include a lab technician, a scientist seeking to extrapolate data, a doctor and any other individual that may benefit from receiving and viewing analyte datum 160.

With continued reference to FIG. 1, apparatus 100 contains a portable device 144, wherein the portable device 144 is configured for point of care diagnostics. "Portable device" as defined herein refers to a device that may be carried or moved around from one location to another without the use of specialized equipment such as a forklift. Portable device 144 may be a device which can be used in a plurality of locations and not a specialized location such as a lab. Portable device 144 may further include a device that does not need to be plugged into a wall outlet, or mounted onto a surface prior to use. "Point of care diagnostics" as described herein refers to the ability to detect and diagnose a disease or an analyte at or near a patient site. As opposed conventional to lab testing wherein a sample must be shipped or delivered to a lab, point of care diagnostics allows a physician, operator, or user to determine the properties of an analyte at or near the same location at a patient. Point of care diagnostics may include a device situated within an office or within a room in the office. Point of care diagnostics may further include a device that be used at home without the need for special equipment. Special equipment may include any equipment that may ordinarily be within a doctor's office and not within the home of an ordinary person. Point of care diagnostics may further include a "device kit" wherein the device kit contains any and all material necessary for detection of an analyte on site. Point of care diagnostics may further include same day testing wherein an analyte is detected within the same day as the sample/analyte was received. Pont of care diagnostics may further include same time testing wherein an analyte is detected at the same time the patient is present within the room. This may include a time up to an hour, or in some cases, up to six hours. Portable device 144 may be configured for point of care diagnostics such that portable device 144 may be carried outside of a conventional lab and into a plurality of areas, such as a home or a doctor's office. Portable device 144 may further be configured for point of care diagnostics wherein a user may place portable device 144 within a bag, backpack or purse and used in any remote location. In some embodiments, optoelectronic reader device 104 is substantially encased within portable device 144. In some embodiments, optoelectronic reader device 104 includes portable device 144. In some embodiments, apparatus 100 includes a battery 172. Additionally, or alternatively, portable device 144 may include a battery 172 wherein portable device 144 may be used without an electrical connection such as a wall outlet. In some embodiments, portable device 144 may include a removable battery 172, wherein a battery 172 can be removed and replaced with a new battery 172. Battery 172 as defined herein refers to any battery 172 used to power conventional battery-operated devices. This may include a battery 172 suitable to power a flashlight, a smartphone, a lamp, a radio, a watch, and the like. In some embodiments, battery 172 may include a disposable battery 172. In some embodiments battery 172 may include a rechargeable battery 172. In some embodiments, portable device 144 may include a charging port wherein a charging chord may be used to recharge battery 172. Charging port may be connected to an electrical outlet such as a wall socket or a power bank. Charging port may further be connected to another device containing a battery 172 or a source of electricity wherein the device may recharge battery 172. In some embodiments, battery 172 may be used to power computing device, microfluidic pump 112, optics subassembly 124 and any other components described in this disclosure that may use electrical devices as described in this disclosure.

With continued reference to FIG. 1, apparatus 100 may include a mechanical housing. As used in this disclosure, a "housing" refers to an outer structure configured to contain a plurality of components, such as, without limitation, components of apparatus 100 as described in this disclosure. In a non-limiting example, housing may include an outer casing of apparatus 100. In some cases, housing may be made from a durable, lightweight material such as without limitation, plastic, metal, and/or the like. In some embodiments, housing may be designed and configured to protect sensitive components of apparatus 100 from damage or contamination. In a non-limiting example, apparatus 100 may include one or more flat facets located on mechanical housing configured to constrain optoelectronic reader device 104 as described above in this disclosure. As described herein "flat facet" refers to a surface or object that is smooth and event, without any significant curvature or bumps. In another non-limiting example, mechanical housing may include one or more physical notches and/or grooves that allow for precise placement of devices and/or components. In yet another non-limiting example, at least a mechanical housing may include one or more optical markers or alignment indicators that are visible (through human eye, microscope, any other imaging system, and/or the like) and allow for accurate positioning of devices and/or components. In a further non-limiting example, mechanical housing may include one or more tapered or angled surfaces that guide the one at least a fluid 116 through apparatus 100. In other non-limiting example, mechanical housing may include one or more surface coatings and/or modifications that reduce the likelihood of unwanted adhesion or interference with external components such as, without limitation, external device as described in further detail below. Additionally, or alternatively, mechanical housing may further include features such as latches, clips, or other fasteners that help to secure apparatus 100 in place during use.

With continued reference to FIG. 1, apparatus 100 may further contain a receiving pocket 176, the receiving pocket 176 configured to receive a microfluidic cartridge. Receiving pocket 176 may be located on mechanical housing wherein microfluidic cartridge is inserted at least partially into mechanical housing. "Microfluidic cartridge" as defined herein is a component used for detection or analysis of fluids on a microscale level. Microfluidic cartridge may include a channel, reservoir 120 or valves that are configured to hold a microfluid containing the analyte that will be detected. Microfluidic cartridge may be made of a transparent material such glass or plastic wherein a light may emit through the transparent material and receive an optical property 140 form the fluid. Microfluidic cartridge may be a disposable cartridge wherein the microfluidic cartridge may be used for one-time use applications. Microfluidic cartridge may be placed within receiving pocket 176 wherein apparatus 100 may sense an optical property 140 of fluid contained within microfluidic cartridge. Microfluidic cartridge may contain an inlet wherein a fluid such as a blood sample is injected into the inlet. Microfluidic cartridge may include any microfluidic cartridge, microfluidic feature or microfluidic device as disclosed in U.S. Nonprovisional application Ser. No. 18/121,712.

Referring now to FIG. 2, an exemplary embodiment of an apparatus 200 for analyte detection is illustrated. FIG. 2. shows an artistic illustration of the expanded view of one embodiment of apparatus 200 comprising three different sub-assemblies: the optical sub-assembly, the optoelectronics sub-assembly, and the microfluidic pump sub-assembly. Apparatus 200 includes an upper housing 204, and an on-off switch cover. The optoelectronics sub assembly includes an on-off switch 212, a digital board 216, a ribbon cable 220 and an analog board 224. The motor sub-assembly includes limit sensors 228, motor boards 232, a plunger grabbing mechanism 236 and a stepper motor 240. The optics sub assembly includes an optical board 244. A cartridge pocket 248 is connected to the optical board 244 and configured to receive a microfluidic cartridge as described in this disclosure. Apparatus 200 further includes a bottom housing 252, wherein the bottom housing 252 and the upper housing 204 contain the components within apparatus 200. Apparatus 200 further includes the pocket where the disposable cartridge can be inserted, and the mechanical housing. Mechanical housing includes an upper housing 204 and a lower/bottom housing 252. Mechanical housing may contain any housing as described in this disclosure. Apparatus 200 further includes an on/off switch. On/off switch may be used to control the power output of apparatus 200. For instance on/off switch may engage apparatus 200 in an "position" wherein electrical power is delivered to a light source or a sensor for analyte detection. One/off switch may further include an on/off cover, wherein the cover is configured such that a user may interact with on/off switch. Cover may further provide aesthetics benefits to apparatus 200 wherein cover compliments an upper housing. Cover may further constrain on/off switch withing upper housing and lower housing. Apparatus 200 further includes a digital board. Digital board may include a computing device as described in this disclosure. Digital board may provide for communicative connection between a variety of components of apparatus 200. digital board may be configured to handle binary or digital signals such as communication with a remote device and the like. for example, and without limitation digital board may provide a communicative connection between processor and memory, wherein memory contains instructions configuring process to generate a result or to transmit data across a network. Apparatus 200 further includes an analog board. Analog board may be used to collect analog signals such as inputs from a sensor device analog board and digital board may be connected using an analog to digital converter wherein input signals into analog board may be received by digital board. Apparatus 200 further contains a ribbon cable wherein the ribbon cable connects the analog board to the digital board. On/off switch, Digital board, ribbon cable and analog board may be included in an optoelectronics sub-assembly. Optoelectronics sub-assembly is a sub assembly of apparatus 200 which primarily deals with data acquisition and the processing of data using a computing device.

With continued reference to FIG. 2, apparatus 200 includes a motor-sub assembly including at least one limit sensor 228, at least one motor board, at least one plunger grabbing mechanism and at least one stepper motor. "Motor-sub assembly" as defined herein is a sub assembly of apparatus 200 which is configured to route a biological sample that is received by apparatus 200. Biological sample may be located within a microfluid cartridge wherein moto assembly is configured to route biological sample within microfluidic cartridge. At least one limit sensor 228 may include any sensor as described in this disclosure. At least one limit sensor 228 may further comprise a limit switch. A "limit switch" as described herein is a switch operated by the motion of a part. In a non-limiting example, limit switch may be used to indicate detect receiving of a microfluidic cartridge. The placement of a microfluidic cartridge within a receiving pocket will trigger motor-sub assembly to being detection of the analyte. Apparatus 200 further includes motor board wherein motor board may contain an electronically driven motor or at least one stepper motor. Motor board may be used to drive at least one plunger mechanism.

With continued reference to FIG. 2, apparatus 200 includes the optics sub assembly. Optics sub assembly may include any optics subassembly as described in this disclosure. Optics sub assembly includes an optical board. Optical board may include a light emitting device and a sensor as described in this disclosure. The optical source in apparatus 200 may be a distributed feedback laser (DFB), a (sampled grating) distributed Bragg reflector laser (DBR laser), a vertical-cavity semiconductor emitting laser (VCSEL), a Vernier-tuned (VT) DBR laser, coupled ring-resonator laser (CRR), or any other laser diode configuration that may be tunable thermally across the resonances of the sensing element. The optical-subassembly and/or its components may be fully or partially integrated on a chip or through alignment and packaging of multi-photonic chiplets or a hybrid version of these alternatives.

With continued reference to FIG. 2, apparatus 200 further includes a cartridge pocket. Cartridge pocket may include a receiving pocket or any other openings or pockets that may be configured to receive a microfluidic cartridge.

Figure 3:
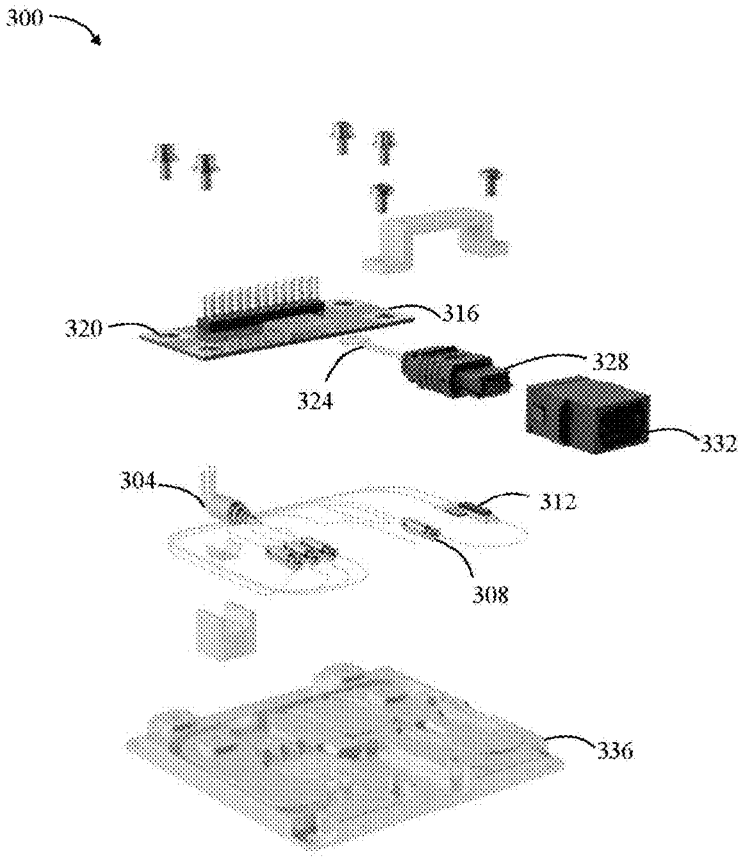
FIG. 3 illustrates an exemplary embodiment of the optical sub-assembly comprising a custom-packaged TO-can laser.
Figure 7:
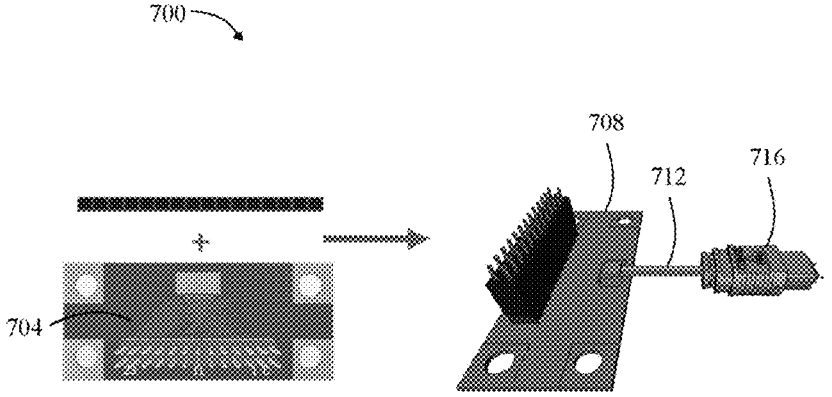
FIG. 7 illustrates an exemplary embodiment of a photodetector sub-assembly.

Referring now to FIG. 3, an exemplary embodiment of an optical subassembly 300 of apparatus as described in this disclosure is illustrated. The optical subassembly includes a custom-packaged TO-can laser 304, a silica planar-waveguide circuit (PLC) splitter 308, a silicon-nitride waveguide based unbalanced Mach-Zehnder interferometer on a photonic chip 312, an array of photodiodes wire-bonded to a carrier 316, a printed-circuit board (PCB) 320 that is fiber-coupled to a ribbon cable 324, and connected to a male mechanical transfer (MT) ferrule inside a multi-fiber push-on (MPO) connector 328. The MPO connector is attached to a multi-fiber push-on (MPO) adapter 332 housed inside the cartridge pocket that accepts an MPO connector with a female MT ferrule. The sub assembly further contains a housing 336 configured to hold the optical subassembly 300 together. The optical source/device in apparatus may be a distributed feedback laser (DFB), a (sampled grating) distributed Bragg reflector laser (DBR laser), a vertical-cavity semiconductor emitting laser (VCSEL), a Vernier-tuned (VT) DBR laser, coupled ring-resonator laser (CRR), or any other laser diode configuration that may be tunable thermally across the resonances of the sensing element. The optical subassembly 300 and/or its components may be fully or partially integrated on a chip or through alignment and packaging of multi-photonic chiplets or a hybrid version of these alternatives. It may be possible to include a silica PLC splitter as described in this disclosure. Additionally or alternatively, in some embodiments, it may be possibly to eliminate the need of the silica PLC splitter described in this disclosure that is used to tap off the output power of laser into a frequency discriminator chip through realization of both the splitter and the UMZI on the same chip. It may also be possible to integrate a photodiode array sub-assembly as illustrated in FIG. 7 and/or the entailed trans-impedance amplifiers (TIAs) (depicted to be included on the electro-optic board of the optoelectronics sub-assembly in FIG. 9 as a nonlimiting example) on the same passive chip through bonding or transfer-printing or a separate active/passive/hybrid chiplet. Optoelectronic reader device 104 may be configured to interrogate optical subassembly and/or photonics chip and/or chiplets via horizontal edge coupling. For the purposes of this disclosure, an "edge coupling" is a process of coupling light from an optical waveguide or resonator to a photodetector or optical fiber located in close proximity and on the edge of the waveguide or the resonator. As a non-limiting example, in the edge coupling, components including optoelectronic reader device 104, optical subassembly, photonics chip, and/or chiplets may be positioned horizontally to each other, and the light propagating through the waveguide may be directed towards optical and/or electro-optical elements. Alternatively or additionally, components including optoelectronic reader device 104, optical subassembly, photonics chip, and/or chiplets may be coupled and/or transfer signals therebetween using a vertical coupling. For the purposes of this disclosure, a "vertical coupling" is a process of coupling light from an optical waveguide or resonator to a photodetector or optical fiber located in close proximity and vertically to the waveguide or the resonator. As a non-limiting example, in the vertical coupling, components including optoelectronic reader device 104, optical subassembly, photonics chip, and/or chiplets may be positioned perpendicular to each other, and the light propagating through a waveguide may be directed upwards towards one or more elements from one or more other elements. Alternatively or additionally, optoelectronic reader device 104 may be configured to interrogate optical subassembly and/or photonics chip and/or chiplets using one or more grating couplers such as etched and/or surface grating couplers, using one or more polymer optic connector, or the like; for the purposes of this disclosure, a "grating coupler" is an optical component that is used to couple light into and out of an optical waveguide.. One or more elements and/or components of optoelectronic reader device 104, optical subassembly, photonics chip, and/or chiplets using co-packaged optics, thermo-plastic and/or other polymer based micro-lenses and light turn modules.

The relative movement of the output frequency of the source may then be evaluated (e.g. by using the spacing between the output fringes of the UMZI as shown in the bottom right power vs. time). The choice of the optical source may be determined by the required wavelength resolution for sensing, the material platform of the passive components, and/or the sampling rate of the read-out electronics. The frequency drift of the laser caused by the inherent white and flicker frequency noise components may lower the achievable wavelength resolution in the sampling period while the required relative-intensity-noise and the output power of the laser may be determined by the dynamic range of the electronics and the extinction ratio of the sensor element.

Figure 4:
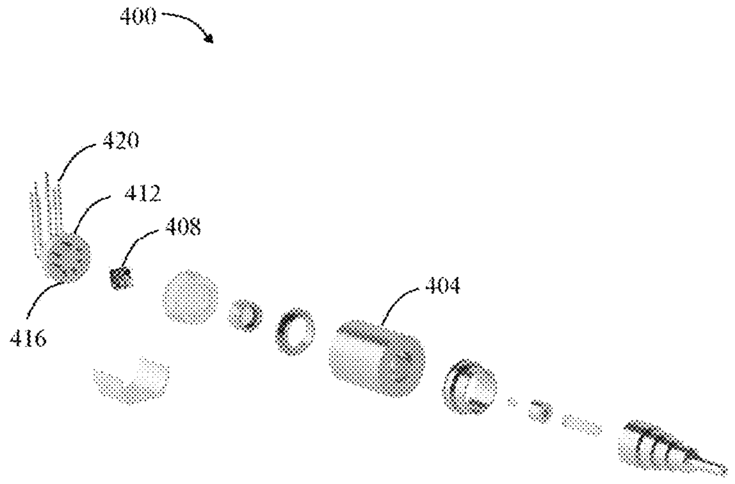
FIG. 4 illustrates an exemplary embodiment of a laser sub-assembly.

Referring now to FIG. 4, an exemplary embodiment of a TO-can laser 400 for an optics subassembly is illustrated. Optical device includes a TO-can 400 laser sub assembly. "TO-can 400 Laser" as described herein is a laser encased within a metal can 404, wherein the metal can 404 may be used to mount TO-can 400 laser onto an assembly. TO-can 400 laser may include a laser diode 408. Laser sub assembly includes a 1310 nm distributed feedback laser chip commonly used in fiber to the home (FTTH) applications which is custom-packaged with a Peltier thermo-electric controller element 412, thermistor, and monitor photodiode into a fiber-coupled TO-can 400 with a broad aluminum base 416 to maximize heat-sinking efficiency. FIG. 4 further shows also shows wire-bonds 420 going from laser contact pads to sub-carrier pads that are then routed to the leads of the TO-can laser 400.

Figure 5:
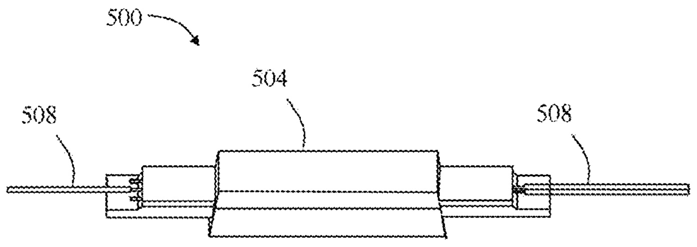
FIG. 5 illustrates an exemplary embodiment of a silica polarization maintaining splitter.

Referring now to FIG. 5, a silica PLC-based splitter 500 is illustrated. Silica PLC-based splitter 500 is an optical splitter similar to an optical splitter as described in this disclosure. The splitter 500 is realized by packaging the silica PLC splitter chip 504 with a PM fiber array 508 on either side. Silica PLC based splitter 500 (Splitter) is a device that splits an incoming light beam into multiple light beams. Splitter 500 may include an input and an output wherein a light beam is fed into the input and a plurality of light beams are emitted through the output. Splitter 500 may include a waveguide similar to a waveguide as described in this disclosure. splitter may further include a plurality of waveguides wherein each waveguide is configured to guide the waves of the plurality of light beams. Silica may be used as a substrate in a PLC splitter due to its favorable optical properties. Splitter 500 may include a polarization maintaining (PM) PLC splitter with a 5/95 splitting ratio. The splitter is realized by packaging the silica PLC splitter chip with a PM fiber array on either side.

Referring now to FIGS. 6A-D, an exemplary illustrative layout of a silicon nitride waveguide based unbalanced MZI on a chip 600 to be used as a frequency discriminator to linearize the wavelength sweep of the laser is illustrated. In addition, FIG. 6 illustrates Shown are the waveguide cross-section geometry, mode simulations, general configuration of an unbalanced MZI, and a non-limiting example of experimental results of a fiber-array attached chip with a 14 pm free-spectral range at 1310 nm. The frequency discriminator depicted in FIG. 6 may be used to evaluate the relative wavelength movement of the tuned optical source. While the illustrative example of the discriminator depicted in FIG. 6 utilizes an unbalanced Mach-Zehnder configuration, devices such as stable Fabry-Perot cavity, a ring resonator, a gas cell, a free-space etalon, or any other reference cavity with a known free-spectral range and higher degree of thermal stability may be employed for clocking the read-out electronics as the source wavelength is tuned across the sensing element. In some examples, only the relative movement of source wavelength is of interest and the knowledge of absolute wavelength of source is not required, assuming the material and waveguide dispersion of the sensing element do not significantly vary the group index over the anticipated wavelength drift of the source and reference during the time of measurement.

Figure 6A:
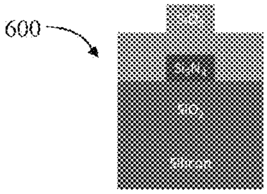
FIG. 6A depicts waveguide cross-section geometry of a silicon nitride waveguide based unbalanced MZI on a chip.
Figure 6B:
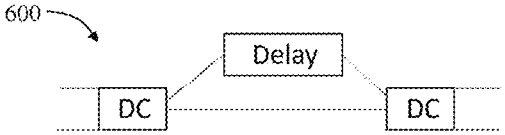
FIG. 6B depicts a general configuration of an unbalanced MZI.
Figure 6C:
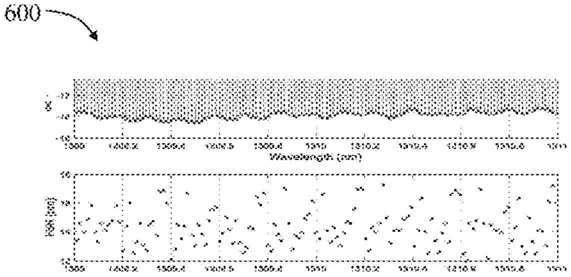
FIG. 6C depicts experimental results of a fiber array attached chip with a 14 pm free-spectral range at 1310 nm.
Figure 6D:
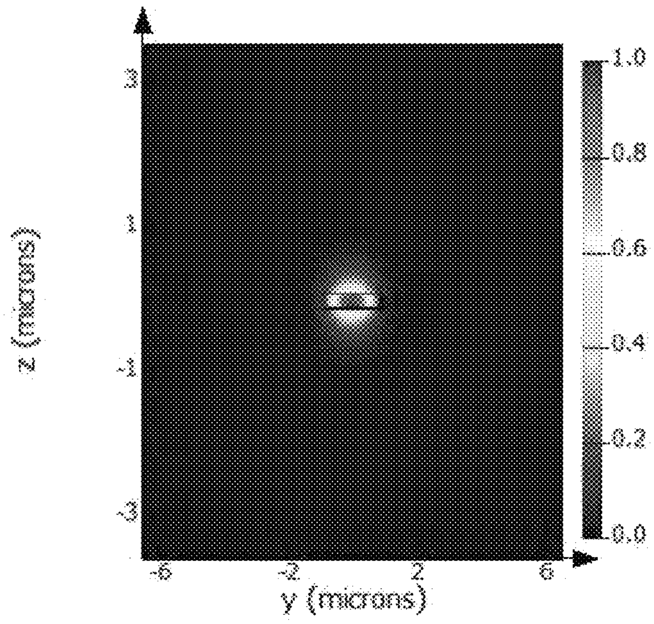
FIG. 6D depicts mode simulations of the silicon nitride waveguide based unbalanced MZI on a chip.

Referring to FIG. 6D, mode simulations of the silicon nitride waveguide based unbalanced MZI on a chip are illustrated.

Referring now to FIG. 7, an exemplary embodiment of a photodetector subassembly 700 is illustrated. Photodetector subassembly 700 includes an arrangement of photodiode array 704 wire-bonded on a PCB 708 and optically coupled to a fiber array 712 routed into a male MT ferrule inside a MPO connector 716. Photodetector subassembly 700 includes a 16-channel fiber array from MPO connector 716 providing the input signals for the photodetectors that are biased and interrogated via the optoelectronics sub-assembly through the leads on the left of the PCB.

Figure 8:
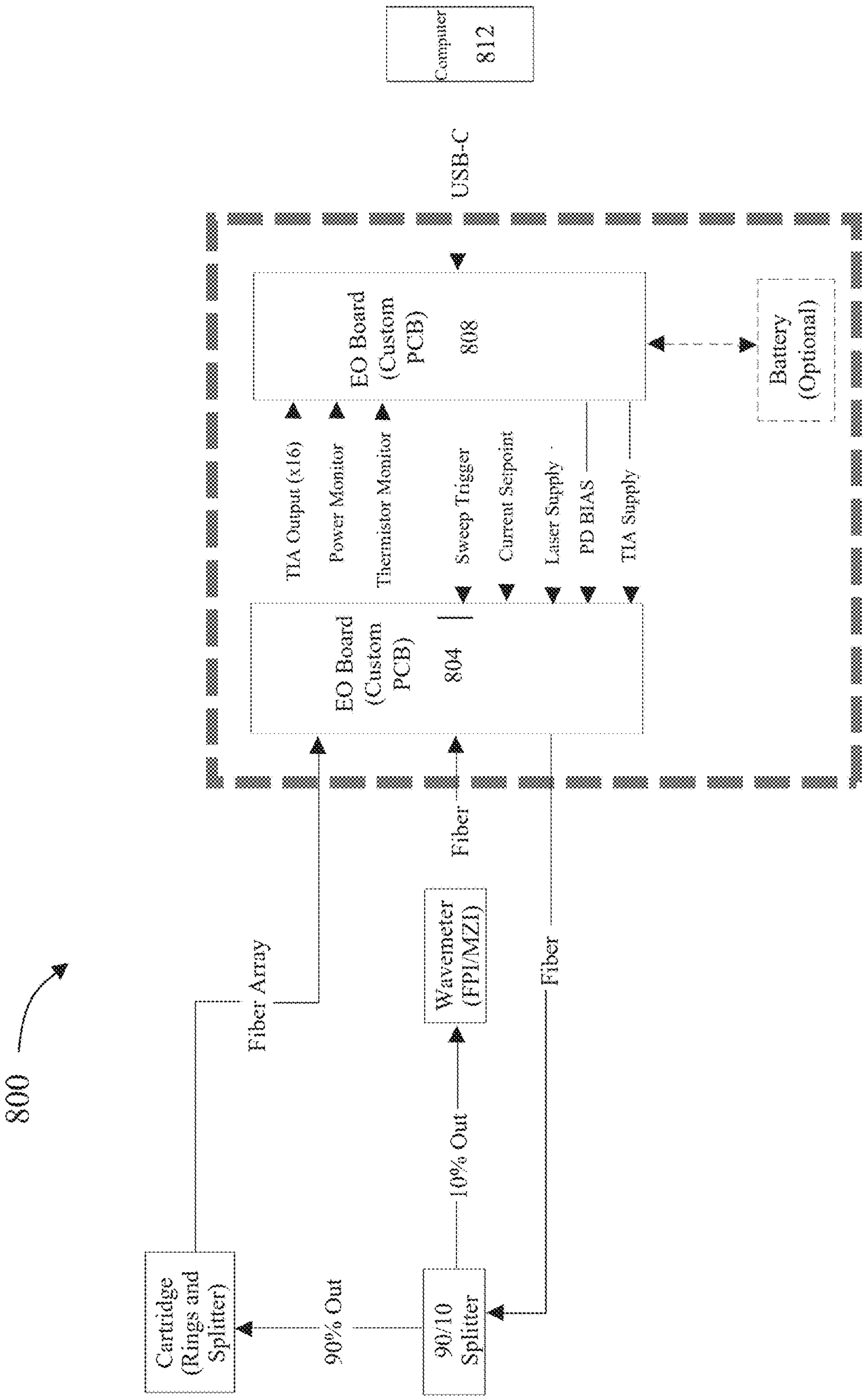
FIG. 8 is a block diagram of a system including an example of a workflow that may be used with such a system according to an embodiment of the invention.

Referring now to FIG. 8, an exemplary high level system diagram of an optoelectronics reader device 800 is illustrated. An electro-optic board 804 contains a component that plugs into an optics board via a male header on a photodiode array assembly. Reader device 800 further includes a printed circuit board (PCB) 808 having a low-noise driver and amplifier electronics for a laser current. Reader device 800 further includes a TEC, a monitor photodiode, a thermistor monitor, and a photodetector array. PCB 808 controls the electro-optic (EO) board 804 electronics, handles power management, data acquisition, and streaming. Reader device 800 may be designed to be capable of running via a 5V supply from a common USB-C cable. Computer 812 may also transit or receive data from reader device through the USB-C. The driver, acquisition, control, and power management electronics described herein may be considered as one of the embodiments of the optoelectronics sub-assemblies for Reader device 800 described here with. It may be possible to integrate an electro-optic board 804 (also referred to as an analog board in this disclosure) and digital board on a similar PCB or realize an ASIC comprising all or part of the electronic components on these PCBs. The implementation of microcontroller-based design of acquisition, streaming, biasing, and monitoring of a laser, thermistor, sensor elements and other communication controls may be considered as one of the embodiments of the reader device 800. The same control system may be realized using a field-programmable gated array (FPGA) or a microprocessor or a system-on-module (SOM). While each of these variants offer their own advantages of flexibility and programmability features, the design choice of these control elements depends on the number of sensing elements involved, and the SWAP+C (size, weight, area, power, and cost) constraints. Reader device may include a battery 812 to power reader device.

Figure 9:
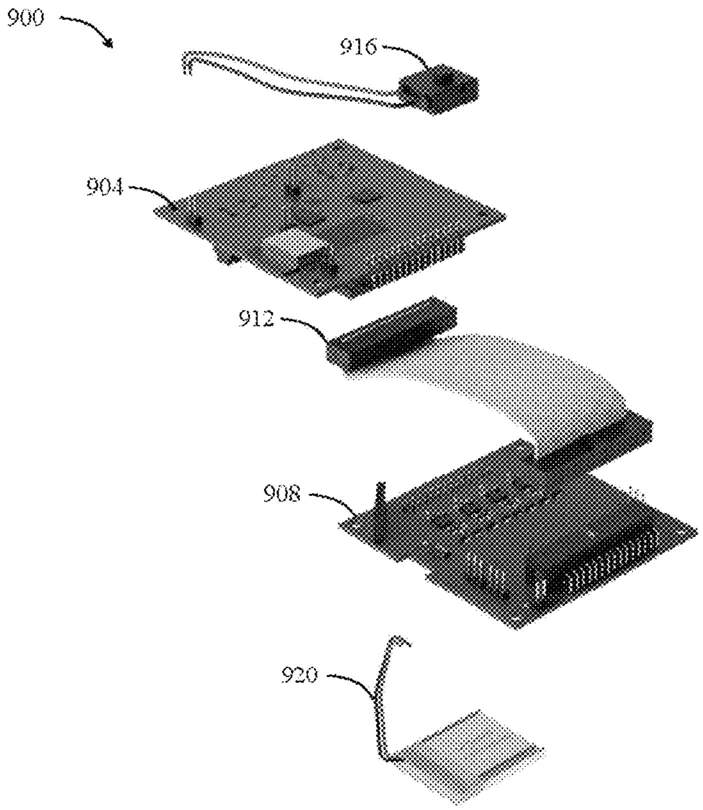
FIG. 9 is an exemplary embodiment of an optoelectronics subassembly having an analog board and a digital board.

Referring now to FIG. 9, An exemplary embodiment of an optoelectronic subassembly 900 is illustrated. Optoelectronic subassembly 900 may include an analog board 904, a digital board 908, a ribbon cable 912 to connect the analog board 904 to the digital board 908, on/off switch 916, and a battery 920 to power the optoelectronics subassembly 900.

Figure 10A:
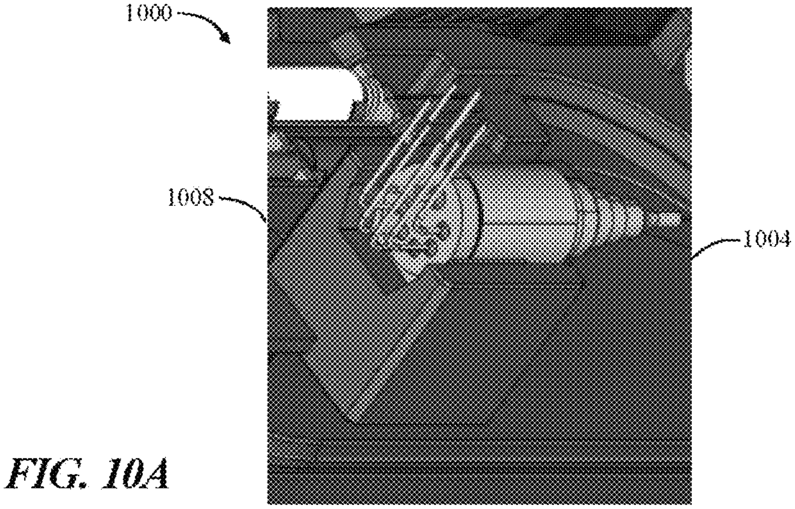
FIGS. 10A-B show an exemplary embodiment of TO-can laser mounted onto an opto-electronic board.
Figure 10B:
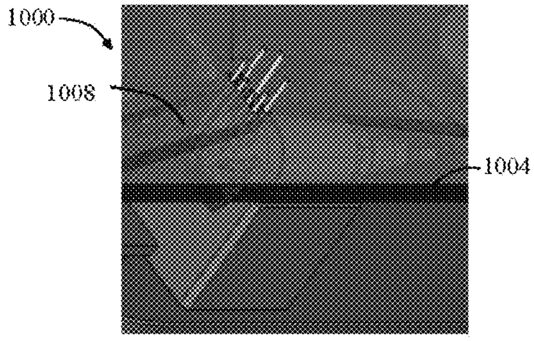

Referring now to FIG. 10, an exemplary embodiment of an assembly 1000 of a TO-can laser 1004 mounted on an analog board 1008 is illustrated. TO-can laser 1004 may include a connecter wherein the connecter is mounted to analog board 1008 and TO-can laser 1004 is mounted to connecter. Connecter may be used to orient the direction of TO-can laser 1004. Connector may include a heat-sink mount wherein TO-can laser sub-assembly 1000 is interfaced on a heat-sink mount with the EO board via through-holes. The pins on the TO-can laser 1004 may be bent 90 degrees up to pass through the holes on the EO-board and soldered for firm contact.

Figure 11:
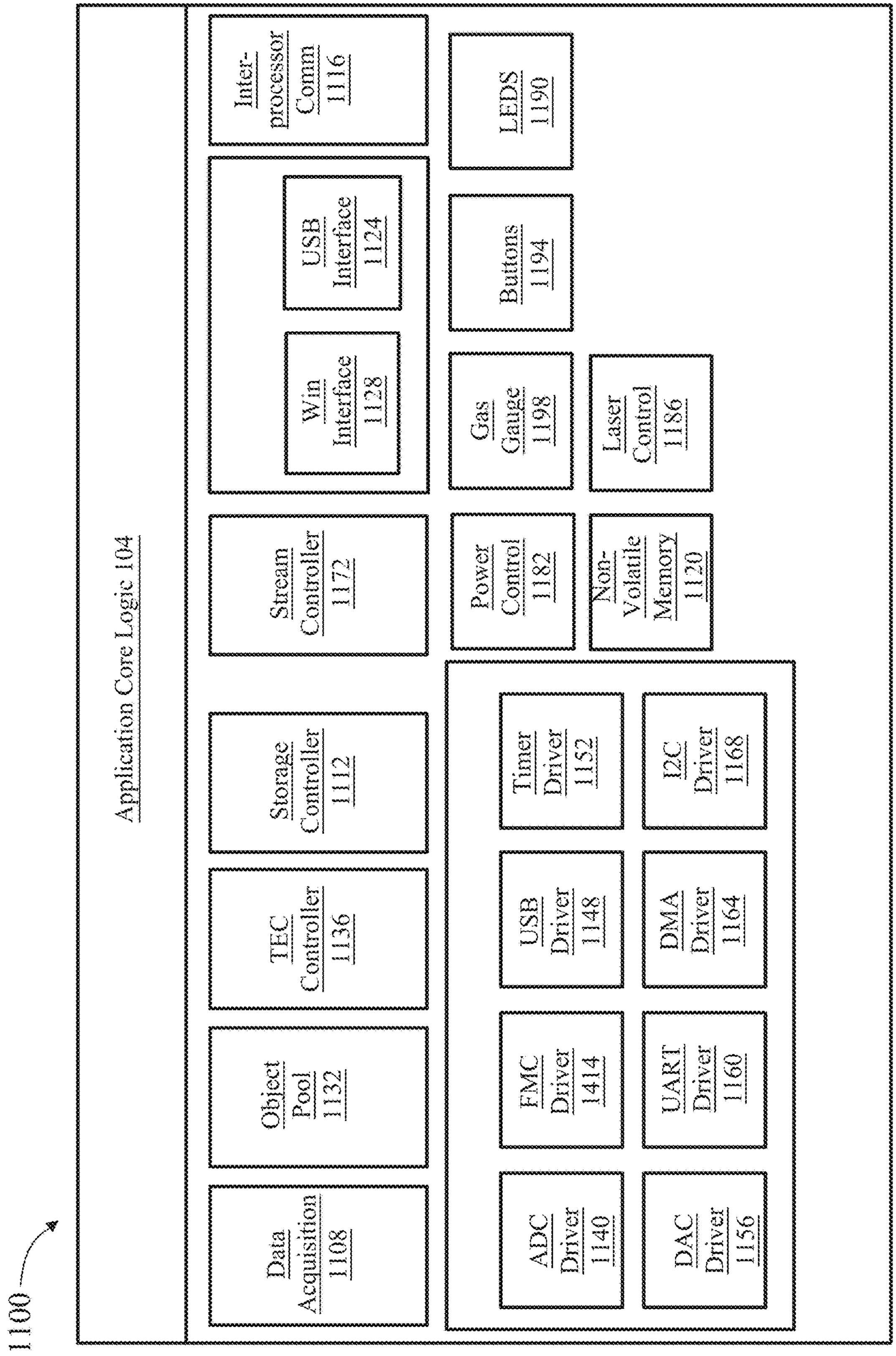
FIG. 11 is a block diagram of an exemplary embodiment of a processor firmware architecture.

Referring now to FIG. 11, An exemplary embodiment of a schematic of a firmware architecture 1100 with two microcontrollers in a master/slave configuration is illustrated. Firmware architecture may include firmware controls that are controlled through application core logic 1104. The firmware controls may use a bang-bang control system to repeatedly sweep the wavelength of the laser by controlling the current on the TEC element while monitoring the voltage output of the thermistor. A data acquisition 1108, a storage controller 1112, and a communication controller (inter-processing comm) 1116 are controlled by a master micro-controller to acquire a plurality of data, save it on an on-board non-volatile memory 1120 for later retrieval of diagnostic measurement, and/or stream the plurality data via user-chosen protocol such as USB-C through a USB interface 1124, a windows (Win) interface 1128 or Wi-Fi. An object pool 1132 may allow for already initialized objects wherein objects are retrieved from an object pool 1132 rather than allocated and destroyed continuously. Object pool 1132 may allow for faster processing times since objects are continuously used. A thermoelectric (TEC) controller 1136 may be used to transport heat away from various processing components in order to maintain ideal processing temperatures. Firmware architecture 1100 may include a plurality of drivers in order to allow firmware architecture 1100 to interact with a variety of components. This includes, but is not limited to an ADC driver 1140, an FMC driver 1144, a USB driver 1148, a timer driver 1152, a DAC driver 1156, a UART driver 1160, a DMA driver 1164, and an I2C driver 1168. System 1100 may include a stream controller 1172 to control the stream of data that is being delivered. Firmware architecture and/or system 1100 may include a power control 1182 to control the power output of a device. System may further include a laser control 1186 to control the power and various setting of a laser on a device. System may further include LEDS 1190 that may be used as indicators that a particular process is running; system is powered on and/or system has completed processing data. Buttons 1194 may be used as input device where buttons 1194 are used to input a command into a device. For example, button may be used to signify to a system that a process should begin or end. A gas gauge 1198 may determine the amount of gas present within a cell wherein the gas is used for laser absorption spectroscopy.

Figure 12:
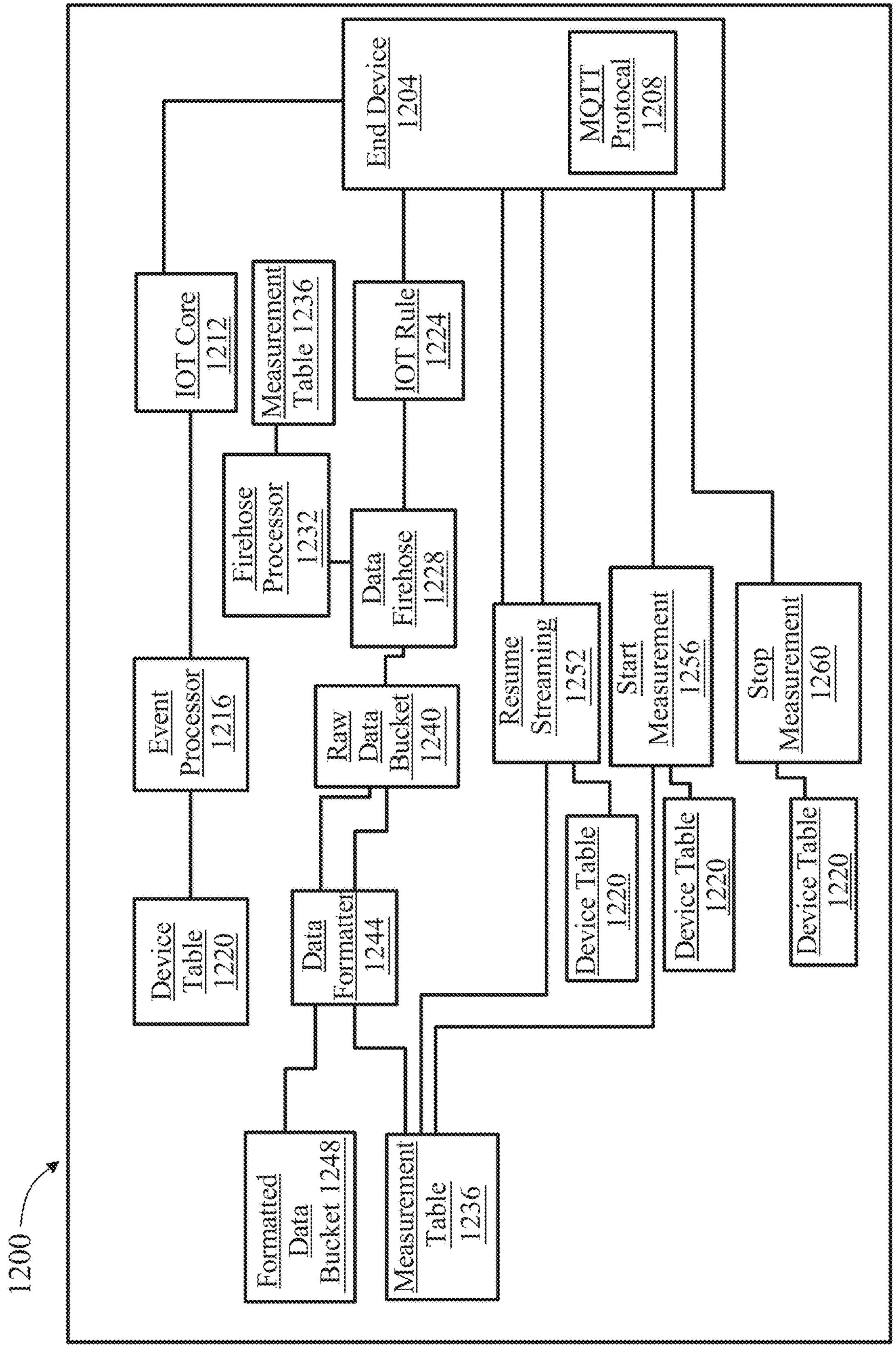
FIG. 12 block diagram of an exemplary embodiment of a cloud architecture.

Referring now to FIG. 12, shows an exemplary embodiment of a cloud architecture 1200. A "cloud architecture" as described herein is a server or a platform that may be accessed through a network. A cloud may contain software that allows users to interact with the network. A cloud may be used to share files or communicate with other devices on a similar work. Clouds may be utilized for a wide variety of application such as data storage, business (processing transactions, making payments, purchasing products, tracking shipments and the like) entertainment, (Movies, films, streaming, music, and the like) social networking, education, GPS, and the like. Cloud architecture as described herein refers to the design and structure that make up the cloud network. In a cloud architecture, a device proximal to apparatus (or integrated within apparatus or connected by wired or wireless/connection) as described above, transmits data to a remote device and/or end device for processing. The end device may contain sufficient computing power to process data and determine calculations and various outputs that may be required. End device may connect using any suitable local or global connection protocol and/or network, including local area network, wide area network, wired and/or wireless connections. Connection protocols may include, without limitation, any protocol for connection including without limitation the MATTER or THREAD protocols promulgated by the Thread Group, Inc. of San Ramon, California. Remote device may then transmit data back to apparatus to display results. A cloud network may include a network and physical components, such as wiring and the like to maintain the network. A cloud network may further include servers such as a computing device that is designed to provide a service to a customer. A cloud network may further include storage such that users may store data on the network. A user may utilize cloud architecture 1200 to securely acquire data from an apparatus as described in this disclosure. A user may further utilize cloud architecture 1200 to securely acquire a plurality of data from a plurality of apparatuses as described in this disclosure. Cloud architecture 1200 may be accessed using a remote device. Cloud architecture 1200 may be stored on a database wherein the plurality of data may be stored on a database as well. In some embodiments cloud architecture 1200 and/or firmware architecture as described in FIG. 11, may perform processing of acquired sensor data from an apparatus as described in this disclosure. Alternatively, apparatus may perform onboard processing of acquired sensor data. Additionally, or alternatively apparatus may limit the data that is processed or uploaded to a cloud or database. Cloud architecture 1200 may include an end device 1204, wherein the end device 1204 may function as a source or destination of the information being received. End device 1204 in this disclosure may refer, in a non-limiting example, to a database or the apparatus described above. End device 1204 may be configured according to a Message Queue Telemetry Transport (MQTT) protocol 1208 wherein the MQTT protocol 1208 is utilized to send and receive data through a network. End device may be connected to an Internet of things (IoT) device such as IoT core 1212, wherein IoT core 1212 is a cloud service that allows end device 1204 to be connected to a plurality of devices on a network and connect with cloud applications on the network. IoT core may be a fully managed cloud service that allows devices to connect seamlessly over a network. IoT core 1212 may communicate with an event processor 1216 wherein event processor 1216 performs actions once an event is received. Information processed by event processor may be stored on a device table 1220. End device may further send an IoT rule 1224 wherein the IoT rule 1224 performs actions on a network and communicates with other devices. An IoT rule 1224 may send data from a device to a cloud or other cloud networks. Cloud architecture 1200 may further include a data firehouse 1228 wherein the data firehose 1228 may capture and load streaming data into a data lake, a warehouse, or analytical services. A firehouse processor 1232 may send any data to a measurement table 1236. Firehouse processor is a processor configured to process data from data firehouse 1228. Processor may include any processor described herein. Cloud architecture may further include a data formatter 1244, wherein the data formatter 1244 is a computing process in which data is formatted in order to ensure compatibility with another device. Data may be formatted to ensure that data may be accessed through multiple networks. The formatted data may be placed in a formatted data bucket 1248, wherein the formatted data bucket is configured to store the formatted data. Cloud architecture may include a start measurement feature 1256 wherein the start measurement feature sends a signal or commands a device to start measuring data. The data may then be stored on a device table. Cloud architecture may further include a stop measurement 1260 feature wherein the stop measurement feature is configured to stop the measurement of an analyte as described above. Data acquire from the stop measurement 1260 feature is then placed into device table 1220.

Figure 13:
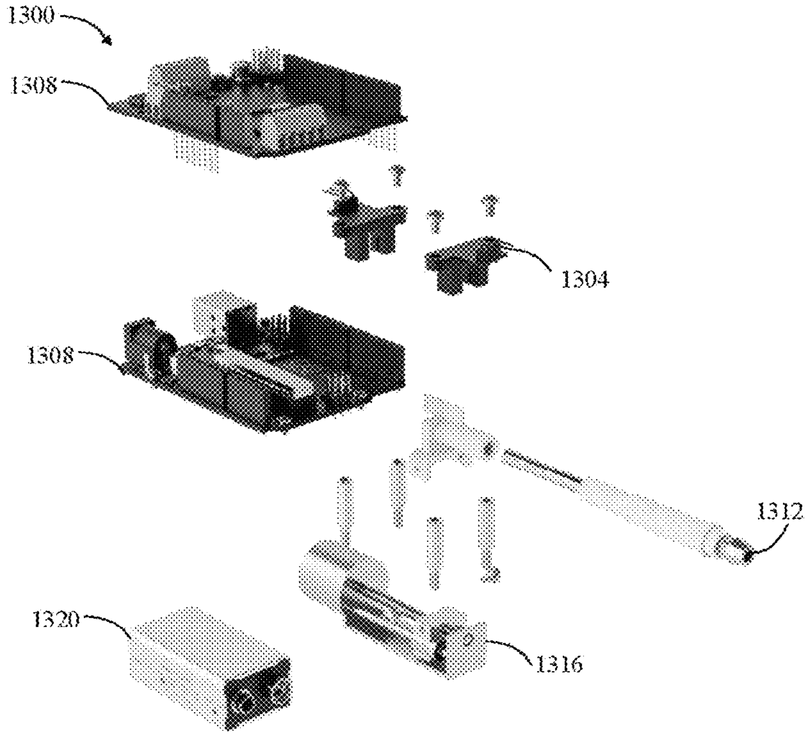
FIG. 13 is an exemplary embodiment of a motor-subassembly.

Referring now to FIG. 13, an exploded view of a motor subassembly 1300 is illustrated. FIG. 13 shows an expanded view of one of the embodiments of motor assembly 1300 used to grab the plunger in a disposable cartridge that would then be used to route the biological sample on the microfluidic cartridge. The motor subassembly 1300 includes limit sensors 1304, motor boards, 1308, a plunger grabbing mechanism 1312, a stepper motor 1316 and a battery 1320. The optics sub assembly includes an optical board 244. Motor subassembly 1300 may include a microfluidic assembly as described in this disclosure. Motor subassembly 1300 may be used to grab a plunger in a disposable cartridge that would then be used to route a biological sample on a microfluidic cartridge. In this embodiment, an Arduino driven stepper-motor is used to drive a spring-loaded collet forward to grab the plunger designed to be within the cartridge.

Figure 14:
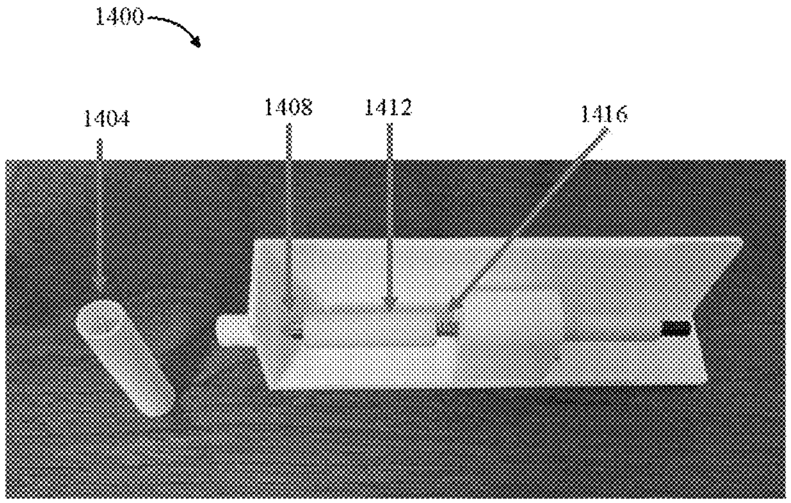
FIG. 14 is an exemplary embodiment of a spring-loaded collet.
Figure 15:
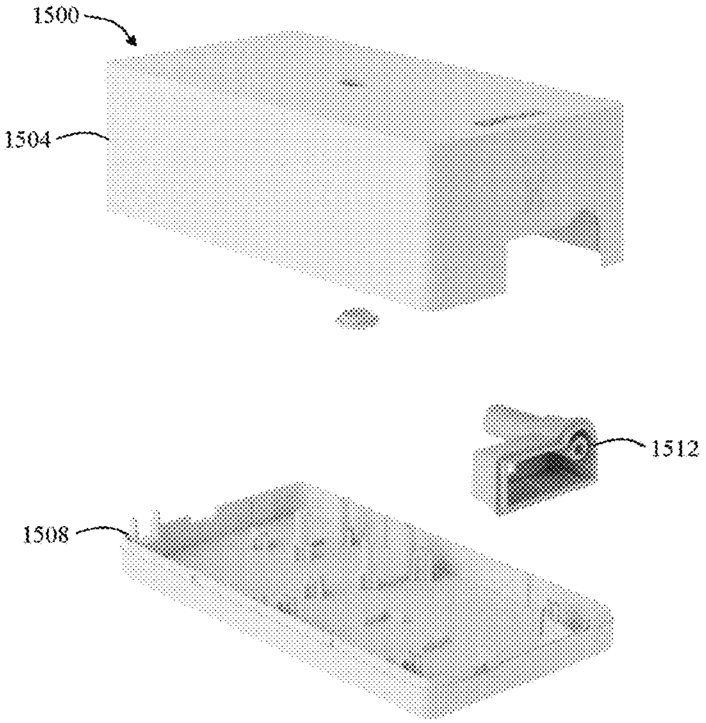
FIG. 15 is an exemplary embodiment of a mechanical housing.

Referring now to FIG. 14, an exemplary embodiment of a spring-loaded collet mechanism 1400 is illustrated. Spring collet mechanism 1400 may be used to implement a pump such as a syringe pump as described in this disclosure, for a microfluidic cartridge. The motor sub-assembly described in FIG. 13 comprises an Arduino driven stepper motor that controls a bi-phase stepper motor driver to control the spring-loaded collet via the movement of a stepper motor. This miniaturized version of microfluidic pump and the accompanying grabbing mechanism fits right beside an MPO connector attached to the photodiode array of the optics sub-assembly in the cartridge pocket, as shown in FIG. 15. This enables seamless control of cartridge photonics and microfluidics. However, it may be noted that the miniaturized pump can as well be operated via the optoelectronics sub-assembly with an additional and compatible driver or an ASIC or a peristaltic or piezo driven pump or may be discarded altogether when operating with a passive microfluidic cartridge. The mechanism includes a mock syringe 1404, a collet, 1408, a second collet 1412 and a spring 1416.

Referring now to FIG. 15, an exemplary embodiment of a mechanical housing 1500 for an apparatus is illustrated. Mechanical housing 1500 includes an upper housing 1504 and a lower housing 1508. An interfacing housing part 1512 allows for simultaneous interrogation of optics via the MPO adapter and the fluidics via the spring-loaded collet mechanism.

Figure 16:
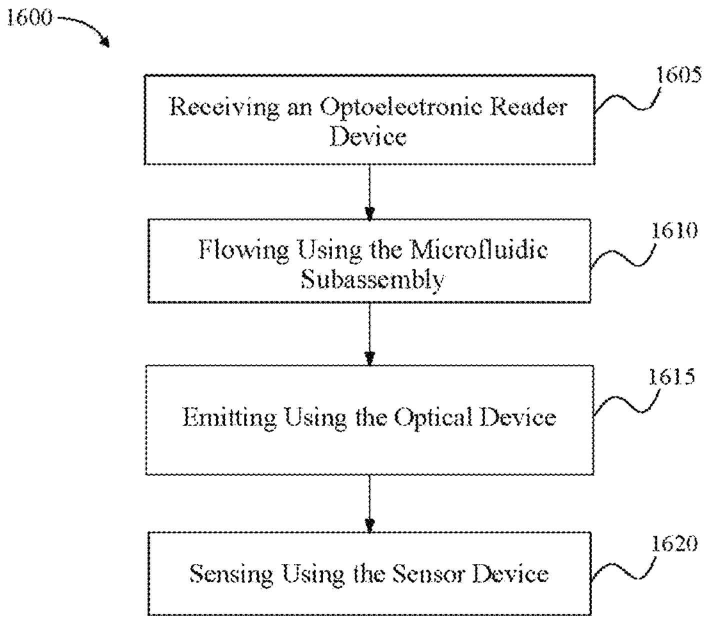
FIG. 16 is a flow diagram of an exemplary method for analyte detection.

Referring now to FIG. 16, a method 1600 for analyte detection is illustrated. At step 1605, method 1600 includes receiving an optoelectronic device. Optoelectronic reader device includes a microfluidic subassembly. Microfluidic assembly includes a microfluidic pump, the microfluidic pump configured to route the flow of at least a fluid, wherein the at least a fluid contains an analyte and at least a reservoir configured to contain the at least a fluid. Optoelectronic reader device further includes an optics subassembly. Optics sub assembly includes an optical device having at least one light source directed at the at least a fluid and a sensor device configured to sense the at least a fluid and detect at least an optical property. In some embodiments, sensor device includes a photodetector, the photodetector configured to collect a receiving light from the optical device. In some cases, the receiving light furthering comprising an evanescent wave. In some cases, the optical device further comprising an optical splitter, the optical splitter configured to split the at least one light source into more than one light beams. In some cases, the more than one light beam individually emitted at more than one analyte, wherein at least one of the more than one light beams is exposed to the at least a fluid. In some cases, the optics subassembly further includes an optical frequency discriminator, the optical frequency discriminator configured to interpolate a change in resonance wavelength. This may be implemented, without limitation, as described above in reference to FIGS. 1-16.

With continued reference to FIG. 16, at step 1610 method 1600 includes flowing, using the microfluidic subassembly, the at least a fluid through the at least a reservoir. This may be implemented, without limitation, as described above in reference to FIGS. 1-16.

With continued reference to FIG. 16, at step 1615 method 1600 includes emitting, using the optical device, at least one light source onto the fluid. This may be implemented, without limitation, as described above in reference to FIGS. 1-16.

With continued reference to FIG. 16, at step 1620 method 1600 includes sensing, using the sensor device, the optical property of the at least a fluid, wherein the optoelectronic reader device is a portable device configured for point of care diagnostics. In some cases, sensing the optical property of the at least a fluid further includes sensing a plurality of optical properties of the at least a fluid, wherein the optical splitter is configured for multiplexed diagnostics. This may be implemented, without limitation, as described above in reference to FIGS. 1-16.

Figure 17:
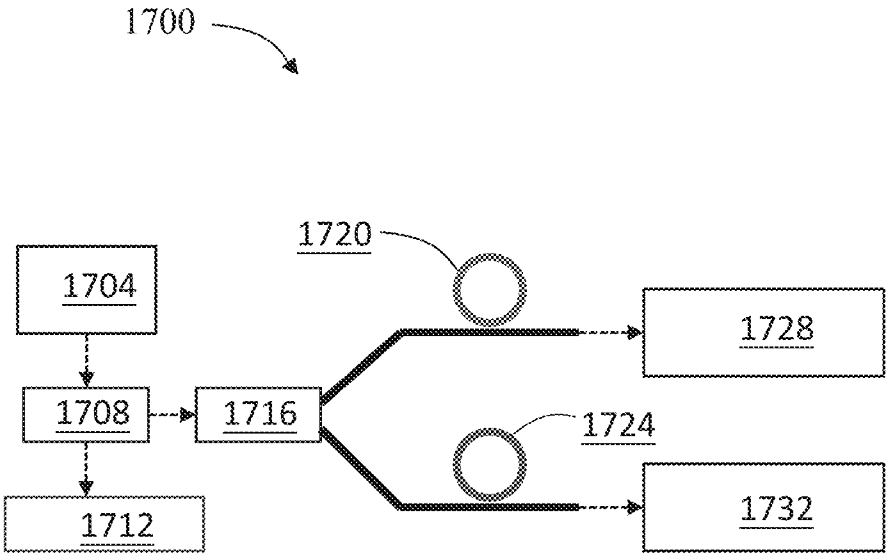
FIG. 17 is a flow diagram for yet another exemplary method for analyte detection.

Referring now to FIG. 17, an exemplary embodiment of a method 1700 for detecting an analyte is illustrated. The method includes emitting light using a tunable laser 1704 through a splitter 1708. The method may further include measuring the frequency of an optical wave using a wavemeter 1712. The method further includes emitting a light into a second splitter 1716. The method may further include emitting a first light from splitter 1716 onto a sensor ring 1720. The method may further include using a photodetector 1728 to determine an optical property of the sensor ring. The method may further include emitting a second light from splitter onto a reference ring 1724. A second photodetector 1732 may then detect the optical properties of the reference ring 1724. In some cases, FIG. 17 illustrates the concept of an apparatus as described in this disclosure to sense the relative shift in resonance wavelength between two identical photonic sensing elements on a chip, one of which is exposed to the biological analyte sample of interest. Depending on the sweep-repeatability error achievable with the optical sub-assembly and the sensitivity requirements of analyte detection, it may also be possible for the apparatus to determine absolute shift of a single sensing element. This evanescent field sensing element on the photonic chip can be one of, or a hybrid combination of possible photonic resonant structures including but not limited to micro-ring resonators photonic crystal cavities, or photonic grating-based resonators or Mach-Zehnder interferometer (MZI) or other interferometric structures. The change in the resonance wavelength is determined by splitting the output power of a laser among all the sensing elements while sweeping the wavelength of the laser across multiple resonances of the sensing elements and processing their optical output spectra. An optical frequency discriminator like an unbalanced MZI or a Fabry-Perot (FP) resonant cavity with a known free spectral range (FSR) and high thermal stability is employed to interpolate and linearize the tuned laser wavelength. As depicted in FIG. 17, the apparatus determines the nature of biological analyte through detection of change in the resonance wavelength by sweeping the wavelength of a tunable laser through the resonances of the sensor chip. The optical source may be split across an array of sensing elements allowing simultaneous sensing of a variety of analytes. This may allow the flexibility for each of the photonic component in the proposed design to be realized in the photonic platform of choice. This includes but is not limited to the currently foundry friendly materials like, silicon, silica, silicon nitride for the ring resonators, splitters, and the frequency discriminator, while the optical source and the photodetectors may be realized in silicon, germanium, III-V, or other waveguide platforms. Such flexibility may enable customization of individual components of the sensor from a myriad of photonic platforms to suit the requirements of the sensing application and/or environment.

Figure 18:
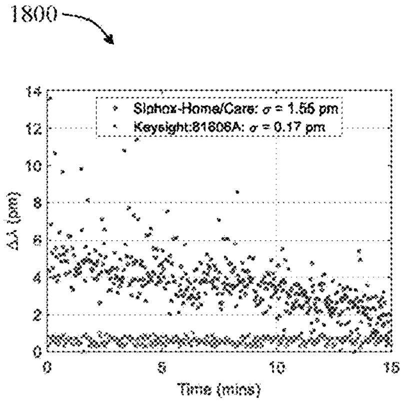
FIG. 18 depicts the measured sweep repeatability error of an optical-sub assembly as compared to a commercial low-noise laser.

Referring now to FIG. 18, the measured sweep repeatability error of an optical sub-assembly as compared to a commercial low-noise laser is illustrated. Shown is a non-limiting example of validation of the laser sweep repeatability inside the complete reader apparatus described in FIGS. 1-17. The sweep repeatability error was evaluated using a standard Hydrogen-Fluoride gas cell with an absorption peak near 1312 nm. The repeatability when compared to a commercial low-noise laser is plotted herein.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 19:
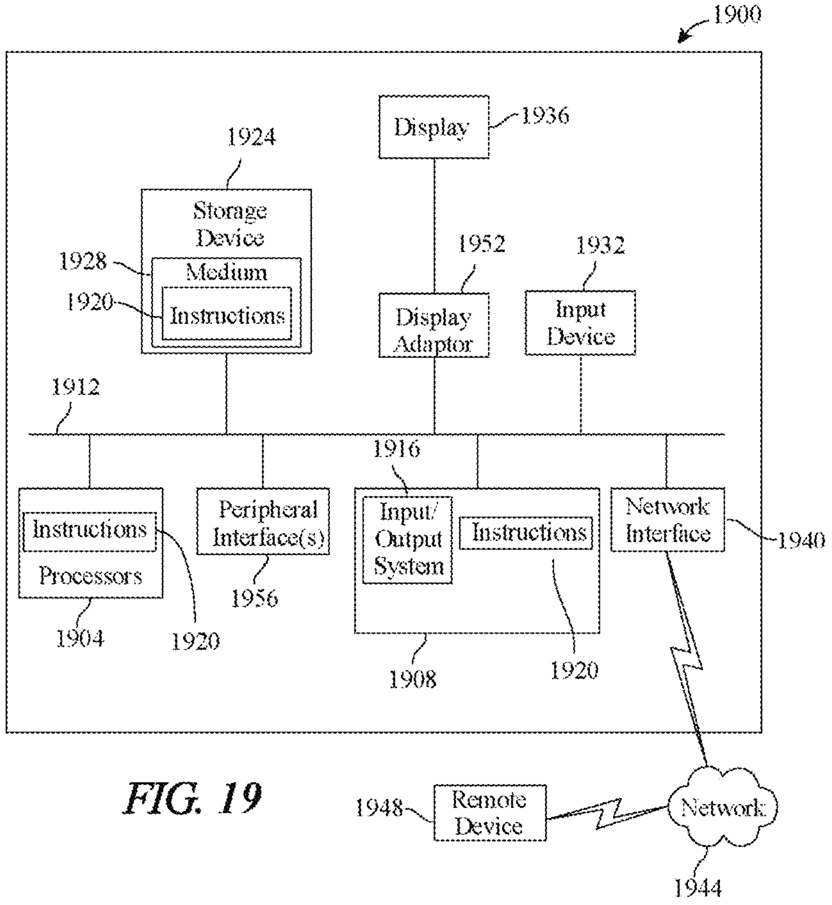
FIG. 19 is a block diagram of a computing system that can be used to implement any one or more of the methodologies disclosed herein and any one or more portions thereof.

FIG. 19 shows a diagrammatic representation of one embodiment of a computing device in the exemplary form of a computer system 1900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1900 includes a processor 1904 and a memory 1908 that communicate with each other, and with other components, via a bus 1912. Bus 1912 may include any of several types of bus structures including, but not limited to, a memory bus, a memory controller, a peripheral bus, a local bus, and any combinations thereof, using any of a variety of bus architectures.

Processor 1904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1904 may be organized according to Von Neumann and/or Harvard architecture as a non-limiting example. Processor 1904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1908 may include various components (e.g., machine-readable media) including, but not limited to, a random-access memory component, a read only component, and any combinations thereof. In one example, a basic input/output system 1916 (BIOS), including basic routines that help to transfer information between elements within computer system 1900, such as during start-up, may be stored in memory 1908. Memory 1908 may also include (e.g., stored on one or more machine-readable media) instructions (e.g., software) 1920 embodying any one or more of the aspects and/or methodologies of the present disclosure. In another example, memory 1908 may further include any number of program modules including, but not limited to, an operating system, one or more application programs, other program modules, program data, and any combinations thereof.

Computer system 1900 may also include a storage device 1924. Examples of a storage device (e.g., storage device 1924) include, but are not limited to, a hard disk drive, a magnetic disk drive, an optical disc drive in combination with an optical medium, a solid-state memory device, and any combinations thereof. Storage device 1924 may be connected to bus 1912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1924 (or one or more components thereof) may be removably interfaced with computer system 1900 (e.g., via an external port connector (not shown)). Particularly, storage device 1924 and an associated machine-readable medium 1928 may provide nonvolatile and/or volatile storage of machine-readable instructions, data structures, program modules, and/or other data for computer system 1900. In one example, software 1920 may reside, completely or partially, within machine-readable medium 1928. In another example, software 1920 may reside, completely or partially, within processor 1904.

Computer system 1900 may also include an input device 1932. In one example, a user of computer system 1900 may enter commands and/or other information into computer system 1900 via input device 1932. Examples of an input device 1932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1932 may be interfaced to bus 1912 via any of a variety of interfaces (not shown) including, but not limited to, a serial interface, a parallel interface, a game port, a USB interface, a FIREWIRE interface, a direct interface to bus 1912, and any combinations thereof. Input device 1932 may include a touch screen interface that may be a part of or separate from display 1936, discussed further below. Input device 1932 may be utilized as a user selection device for selecting one or more graphical representations in a graphical interface as described above.

A user may also input commands and/or other information to computer system 1900 via storage device 1924 (e.g., a removable disk drive, a flash drive, etc.) and/or network interface device 1940. A network interface device, such as network interface device 1940, may be utilized for connecting computer system 1900 to one or more of a variety of networks, such as network 1944, and one or more remote devices 19419 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1944, may employ a wired and/or a wireless mode of communication. In general, any network topology may be used. Information (e.g., data, software 1920, etc.) may be communicated to and/or from computer system 1900 via network interface device 1940.

Computer system 1900 may further include a video display adapter 1952 for communicating a displayable image to a display device, such as display device 1936. Examples of a display device include, but are not limited to, a liquid crystal display (LCD), a cathode ray tube (CRT), a plasma display, a light emitting diode (LED) display, and any combinations thereof. Display adapter 1952 and display device 1936 may be utilized in combination with processor 1904 to provide graphical representations of aspects of the present disclosure. In addition to a display device, computer system 1900 may include one or more other peripheral output devices including, but not limited to, an audio speaker, a printer, and any combinations thereof. Such peripheral output devices may be connected to bus 1912 via a peripheral interface 1956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for performing analyte detection, wherein the apparatus comprises:

- a microfluidic cartridge;
- at least a fluid located within the microfluidic cartridge;
- an optoelectronic reader device, the optoelectronic reader device comprising:
  - a mechanical housing;
  - a microfluidic subassembly located within the mechanical housing comprising:
    - a microfluidic pump, the microfluidic pump configured to route a flow of the at least a fluid, wherein the at least a fluid contains an analyte; and
    - at least a reservoir configured to contain the at least a fluid;
  - an optics subassembly located within the mechanical housing, the optics subassembly comprising:
    - an optical device having at least one light source directed at the at least a fluid;
    - a silica planar-waveguide beam splitter configured for multiplexed diagnostics, wherein the waveguide beam splitter is configured to split the at least one light source into a plurality of light beams having differing power outputs;

a photonic chip:

a silicon-nitride waveguide based unbalanced Mach-Zehnder interferometer on the photonic chip:

an array of photodiodes wire-bonded to a carrier:

a printed-circuit board (PCB) fiber-coupled to a ribbon cable:

a first multi-fiber push-on (MPO) connector connected to the printed-circuit board wherein the first MPO connecter comprises a male mechanical transfer (MT) ferrule; and a sensor device configured to sense the at least a fluid and detect at least an optical property of the analyte, wherein the sensor device comprises a photodetector wherein the photodetector comprises:

a wavelength demultiplexer configured to separate a plurality of wavelengths of light from a shared optical path;

a receiving pocket located on the mechanical housing, wherein the receiving pocket is configured to receive the microfluidic cartridge and wherein the receiving pocket comprises an MPO adapter connected to the first MPO connector and wherein the MPO adapter accepts a second MPO connector comprising a female MT ferrule that accepts the male MT ferrule;

a limit sensor configured to detect a receipt of the microfluidic cartridge; and a motor sub-assembly comprising at least a motor and a plunger grabbing mechanism, wherein the plunger grabbing mechanism is located within the receiving pocket and adjacent to the first MPO connector and wherein the motor is used to drive the plunger grabbing mechanism; and a portable device, wherein the portable device is configured for point of care diagnostics.

2. The apparatus of claim 1, the apparatus further comprising a computing device, the computing device comprising:

at least a processor; and a memory communicatively connected to the processor, the memory containing instructions configuring the processor to:

receive an analyte datum from the optoelectronic reader device; and transmit the analyte datum.

3. The apparatus of claim 2, wherein transmitting the analyte datum comprises transmitting the analyte datum to a database.

4. The apparatus of claim 1, wherein the mechanical housing comprises:

a flat facet located on the mechanical housing configured to constrain the optoelectronic reader device.

5. The apparatus of claim 1, wherein the photodetector is configured to collect a receiving light from the optical device.

6. The apparatus of claim 5, the receiving light comprising an evanescent wave.

7. The apparatus of claim 1, the apparatus further comprising a battery.

8. The apparatus of claim 1, the optics subassembly further comprising a waveguide device, wherein the waveguide device is configured to guide the at least one light source.

9. The apparatus of claim 1, the plurality of light beams individually emitted at more than one analyte, wherein at least one of the plurality of light beams is exposed to the at least a fluid.

10. The apparatus of claim 1, the optics subassembly further comprising an optical frequency discriminator, the optical frequency discriminator configured to interpolate a change in resonance wavelength.

11. A method for analyte detection, the method comprising:

receiving a microfluidic cartridge, wherein at least a fluid is located within the microfluidic cartridge;

receiving an optoelectronic reader device, the optoelectronic reader device comprising:

a mechanical housing;

a microfluidic subassembly located within the mechanical housing comprising:

a microfluidic pump, the microfluidic pump configured to route a flow of the at least a fluid, wherein the at least a fluid contains an analyte; and at least a reservoir configured to contain the at least a fluid;

an optics subassembly located within the mechanical housing, the optics subassembly comprising:

an optical device having at least one light source directed at the at least a fluid;

a silica planar-waveguide beam splitter configured for multiplexed diagnostics, wherein the waveguide beam splitter is configured to split the at least one light source into a plurality of light beams having differing power outputs;

a photonic chip:

a silicon-nitride waveguide based unbalanced Mach-Zehnder interferometer on the photonic chip:

an array of photodiodes wire-bonded to a carrier:

a printed-circuit board (PCB) fiber-coupled to a ribbon cable:

a first multi-fiber push-on (MPO) connector connected to the printed-circuit board wherein the first MPO connecter comprises a male mechanical transfer (MT) ferrule; and a sensor device configured to sense the at least a fluid and detect at least an optical property;

a receiving pocket located on the mechanical housing, wherein the receiving pocket is configured to receive the microfluidic cartridge and wherein the receiving pocket comprises an MPO adapter connected to the first MPO connector and wherein the MPO adapter accepts a second MPO connector comprising a female MT ferrule that accepts the male MT ferrule;

a limit sensor configured to detect a receipt of the microfluidic cartridge; and a motor sub-assembly comprising at least a motor and a plunger grabbing mechanism, wherein the plunger grabbing mechanism is located within the receiving pocket and adjacent to the first MPO connector and wherein the motor is used to drive the plunger grabbing mechanism; and grabbing, using the motor sub-assembly, the microfluidic cartridge as a function of the plunger grabbing mechanism and the at least a motor;

flowing, using the microfluidic subassembly, the at least a fluid from the microfluidic cartridge through the at least a reservoir; and emitting, using the optical device, the at least one light source onto the fluid; and sensing, using the sensor device, the optical property of the at least a fluid, wherein the optoelectronic reader device is a portable device configured for point of care diagnostics, wherein the sensor device comprises a photodetector wherein the photodetector comprises:

a wavelength demultiplexer configured to separate a plurality of wavelengths of light from a shared optical path.

12. The method of claim 11, wherein the photodetector is configured to collect a receiving light from the optical device.

13. The method of claim 12, the receiving light furthering comprising an evanescent wave.

14. The method of claim 11, wherein the plurality of light beams is individually emitted at more than one analyte and wherein at least one of the plurality of light beams is exposed to the at least a fluid.

15. The method of claim 11, wherein sensing the optical property of the at least a fluid further comprises sensing a plurality of optical properties of the at least a fluid.

16. The method of claim 11, the optics subassembly further comprising an optical frequency discriminator, the optical frequency discriminator configured to interpolate a change in resonance wavelength.

* * * * *